(12) United States Patent
Uchiki et al.

(10) Patent No.: US 7,764,731 B2
(45) Date of Patent: Jul. 27, 2010

(54) EQUALIZER AND SEMICONDUCTOR DEVICE

(75) Inventors: Hideki Uchiki, Tokyo (JP); Atsuhiko Ishibashi, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 832 days.

(21) Appl. No.: 11/282,647

(22) Filed: Nov. 21, 2005

(65) Prior Publication Data

US 2006/0114980 A1 Jun. 1, 2006

(30) Foreign Application Priority Data

Nov. 29, 2004 (JP) ............................. 2004-344000
Sep. 22, 2005 (JP) ............................. 2005-274904

(51) Int. Cl.
*H03H 7/30* (2006.01)

(52) U.S. Cl. ........................ 375/229; 327/100; 327/105; 327/237; 327/551; 327/555; 381/103; 702/124; 333/28 R

(58) Field of Classification Search ................. 340/552; 370/338; 375/130, 229, 316, 350; 708/819
See application file for complete search history.

(56) References Cited

U.S. PATENT DOCUMENTS 5,486,787 A * 1/1996 Maekawa et al. ........... 327/560
5,714,918 A * 2/1998 Menkhoff ................. 333/28 R

FOREIGN PATENT DOCUMENTS

| JP | 9-167944 | 6/1997 |
| JP | 2003-168944 | 6/2003 |
| JP | 2004-120468 | 4/2004 |

OTHER PUBLICATIONS

Jong-Sang Choi, et al., "A CMOS 3.5Gbps Continuous-time Adaptive Cable Equalizer with Joint Adaptation Method of Low-Frequency Gain and High-Frequency Boosting", 2003 Symposium on VLSI Circuits, Digest of Technical Papers, 2003, pp. 103-106.

* cited by examiner

*Primary Examiner*—David C Payne
*Assistant Examiner*—Adolf Dsouza
(74) *Attorney, Agent, or Firm*—Oblon, Spivak, McClelland, Maier & Neustadt, L.L.P.

(57) ABSTRACT

The present invention provides an equalizer and a semiconductor device, that can suppress a decrease in S/N ratio of a reception signal, can facilitate a disconnection test by a direct current signal, and are excellent in reproducibility of a transmission signal. A low-pass filter receives a reception signal supplied from a reception end to output a signal obtained by removing a high frequency component from the reception signal. A subtraction unit subtracts an output signal from the low-pass filter from the reception signal. An addition unit adds the reception signal from the reception end to an output signal from the subtraction unit. Thus, an output signal from the addition unit has a frequency characteristic of emphasizing the high frequency component. Then, an amplifier amplifies the output signal from the addition unit to transmit it to an output end.

4 Claims, 12 Drawing Sheets

F I G . 1 1
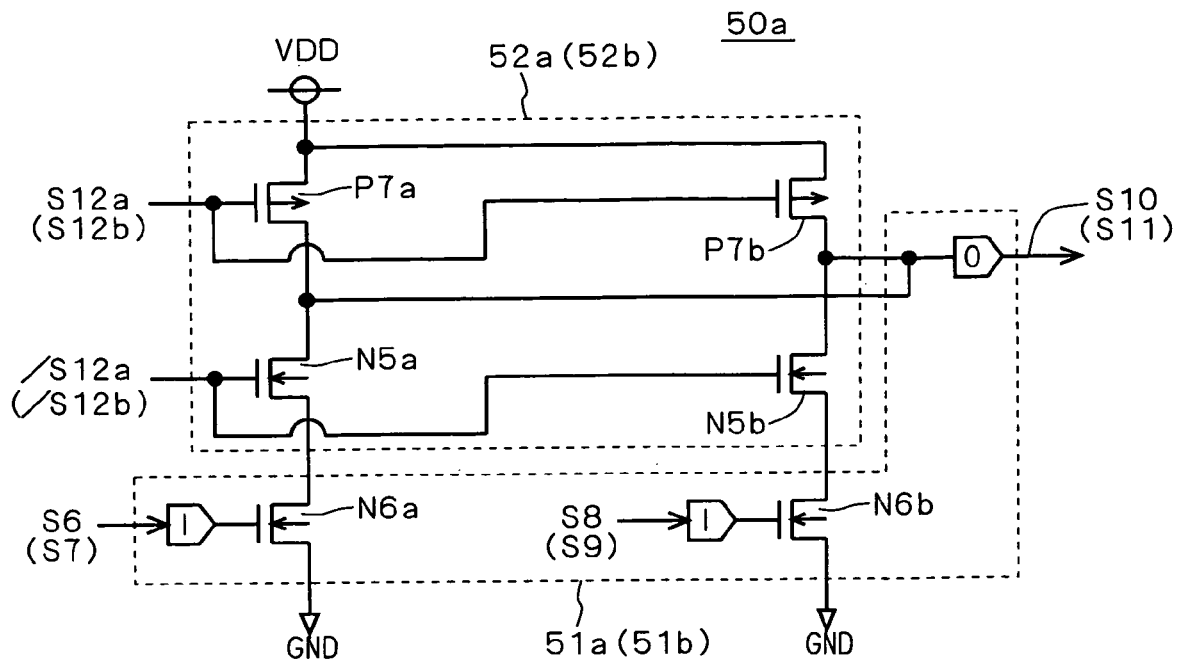
F I G . 1 2
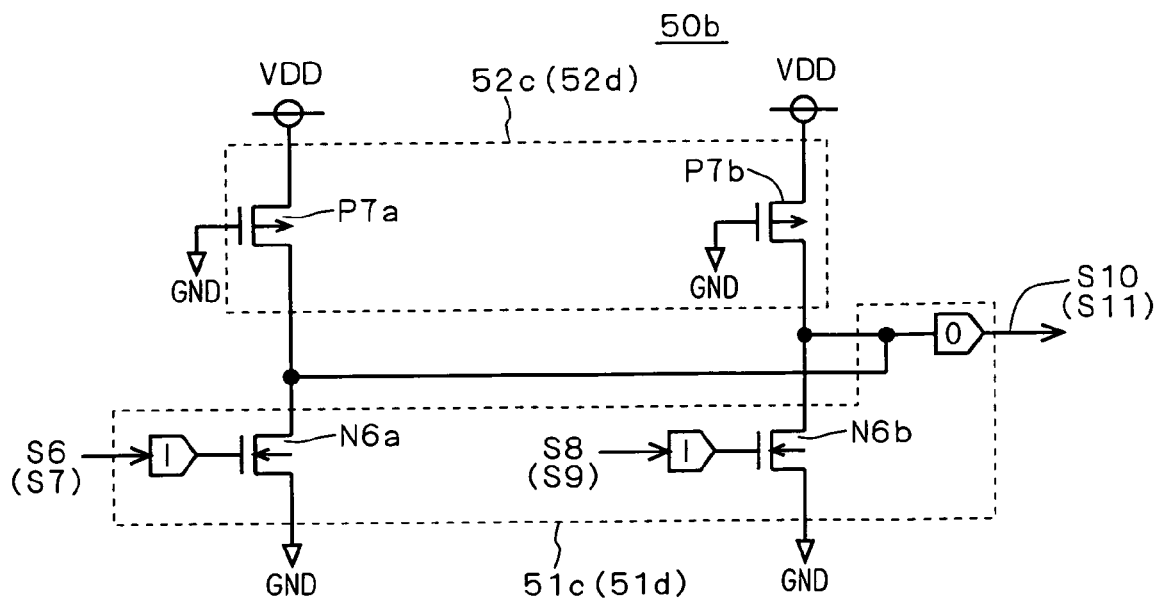

F I G . 1 5
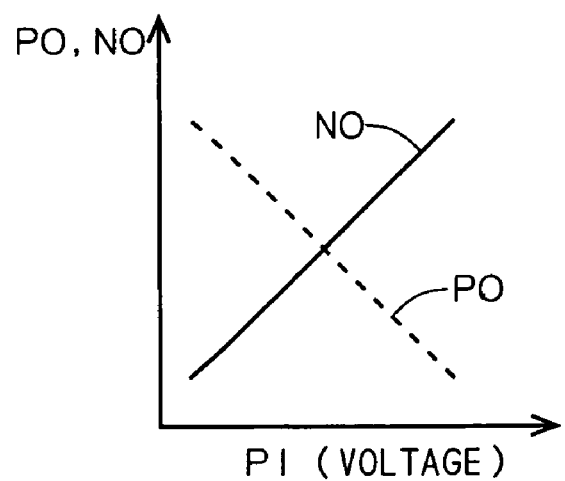
F I G . 1 6
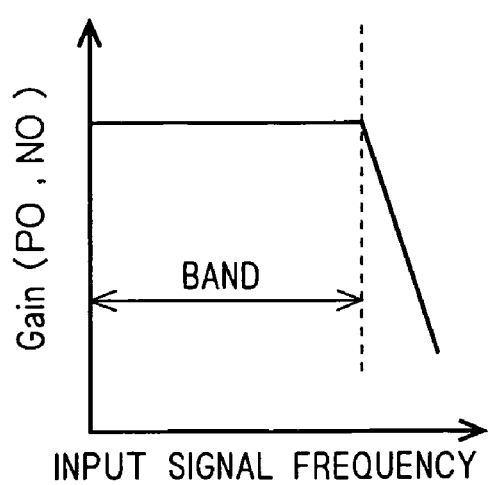

F I G . 2 4
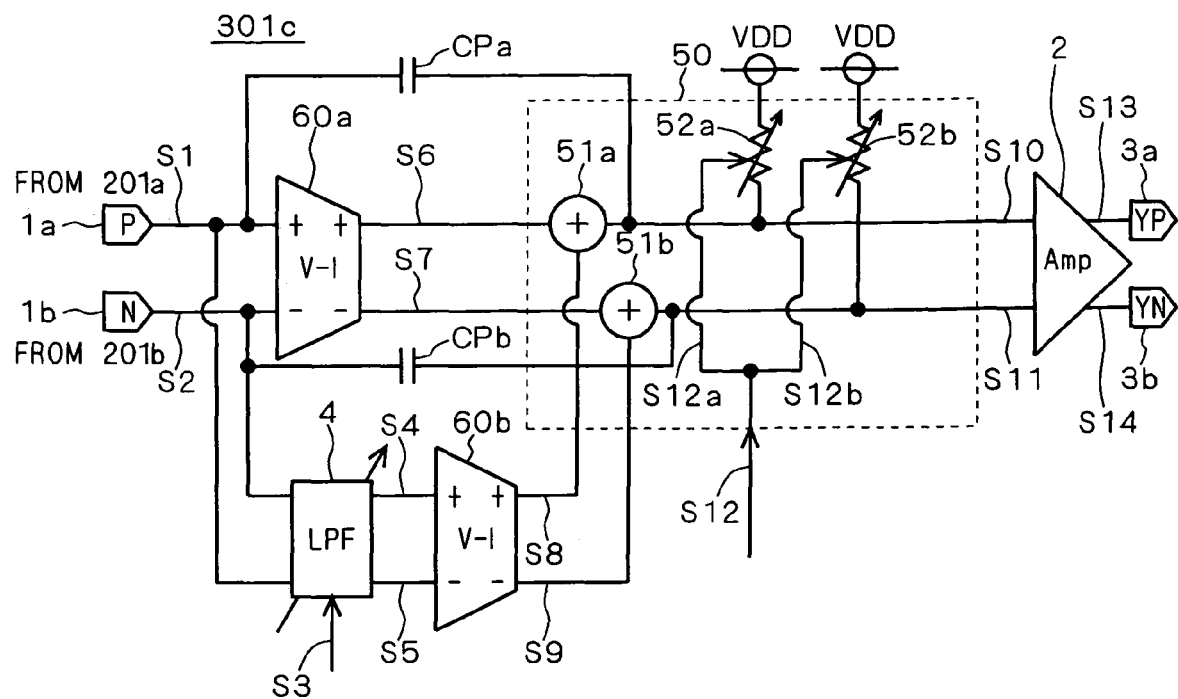

EQUALIZER AND SEMICONDUCTOR DEVICE

BACKGROUND OF THE INVENTION

1. Field of the Invention

The present invention relates to an equalizer and a semiconductor device, that restore a waveform of a transmission signal, which is changed due to attenuation of signals on a transmission path, to an original waveform.

2. Description of the Background Art

On a transmission path such as a printed wiring on a print substrate, the higher the frequency component contained in a transmission signal, the greater the increasing amount of attenuation of the signal. For this reason, the waveform of a reception signal that has reached a signal reception end through the transmission path is distorted with a high frequency component attenuated, as compared with a transmission signal at a transmission end.

Especially in the case of a digital signal, when it becomes impossible to properly recognize "High" or "Low" of a signal at the reception end due to the attenuation of the signal on the transmission path, it then becomes difficult to exchange the signal between a semiconductor integrated circuit device on the transmission side and a semiconductor integrated circuit device on the reception side.

FIG. 1 of Japanese Patent Application Laid-Open No. 2004-120468 shows an example of a circuit configuration of an equalizer for restoring a waveform of transmission signal, which is changed due to attenuation of the signal on the transmission path, to an original waveform. This figure shows an equalizer 18, at the reception end, which includes a high-pass filter 22, an amplifier 24 and an adder 20.

In this equalizer 18, there is adopted a circuit configuration in which a high frequency component of a reception signal extracted with the high-pass filter 22 is amplified with the amplifier 24 and the amplified high frequency component is added to the reception signal with the adder 20. Such a circuit configuration compensates the attenuated high frequency component.

It is to be noted that "A CMOS 3.5 Gbps Continuous-time Adaptive Cable Equalizer with Joint Adaptation Method of Low-Frequency Gain and High-Frequency Boosting" (Jong-Sang Choi et al., 2003 Symposium on VLSI Circuits Digest of Technical Papers 4-89114-034-8, pp. 103-106) also shows a similar circuit configuration to that of Japanese Patent Application Laid-Open No. 2004-120468. Further, in addition to Japanese Patent Application Laid-Open No. 2004-120468 and the above non-patent document, Japanese Patent Application Laid-Open No. 09-167944 (1997) and Japanese Patent Application Laid-Open No. 2003-168944 are related to the present invention.

In the case of the circuit configuration of the equalizer 18 in Japanese Patent Application Laid-Open No. 2004-120468, since only the high frequency component is amplified with the high-pass filter 22 and the amplifier 24, high frequency other than the transmission signal (e.g., noise at the time of switching, etc.) is also amplified. In the meantime, the original reception signal is not amplified, and added with the amplified high frequency component.

Hence in the reception signal added with the high frequency component, the noise ratio increases while the ratio of the high frequency component signal increases. This means a decrease in S/N ratio of the reception signal.

Further, the high-pass filter is normally configured by a capacitive element on the transmission path and a resistive element suspended from one end of the capacitive element. In the case of adopting such a high-pass filter in the equalizer 18, since one and the other ends of the capacitive element on the transmission path are insulated from each another, it is difficult to conduct a disconnection test, by a direct current signal, on whether disconnection of the path among the reception end (b), the high-pass filter 22 and the amplifier 24 has not occurred in the equalizer. Therefore, it is necessary to extra test circuit for the purpose of conducting a disconnection test by a direct current signal.

Further, in the case of the circuit configuration of the equalizer 18 in Japanese Patent Application Laid-Open No. 2004-120468, the amplifier 24 is provided on the path for signal transmission subsequent to the high-pass filter and prior to the adder 20. In this case, the signal transmitted through the high-pass filter 22 and the amplifier 24 lags behind an original reception signal directly inputted into the adder 20, in reaching the adder 20 because of signal delay in circuits on the path. Therefore, the simultaneity of the two signals to be added to each other with the adder 20 is impaired. This makes it difficult to truly regenerate a transmission signal, causing a decrease in reproducibility of a transmission signal.

SUMMARY OF THE INVENTION

An object of the present invention to provide an equalizer and a semiconductor device, that can suppress a decrease in S/N ratio of a reception signal, can facilitate a disconnection test by a direct current signal, and are excellent in reproducibility of a transmission signal.

According to a first aspect of the present invention, an equalizer includes a low-pass filter, a subtraction unit, an addition unit and an amplifier.

The low-pass filter receives a reception signal.

The subtraction unit subtracts from the reception signal an output signal from the low-pass filter.

The addition unit adds the reception signal to an output signal from the subtraction unit.

The amplifier amplifies an output signal from the addition unit.

According to the first aspect of the present invention, a signal mainly composed of a high frequency component, obtained by subtracting from the reception signal the output signal from the low-pass filter, is added to the reception signal, and the added signal is amplified. Thus, as compared with an equalizer where only the high frequency component of the reception signal is amplified and the amplified signal is added to the reception signal, the low frequency component of the reception signal is also amplified in the equalizer of the first aspect, thereby enabling suppression of a decrease in S/N ratio of the reception signal. Further, the equalizer of the first aspect adopts a low-pass filter rather than a high-pass filter. The low-pass filter is normally configured by a resistive element on a transmission path and a capacitive element suspended from one end of the resistive element, and one end of the resistive element on the transmission path is not insulated from the other end thereof. It is thereby possible to facilitate a disconnection test, by a direct current signal, on whether disconnection of the path among the reception end, the low-pass filter, the subtraction unit, the addition unit and the amplifier has not occurred. Furthermore, in the equalizer of the first aspect, the amplifier is arranged on the path subsequent to the addition unit. This prevents delay in a signal, which passes through the low-pass filter and the subtraction unit to reach the addition unit, due to the amplifier. Thereby, the simultaneity is easily maintained between the reception signal and the output signal from the subtraction unit which are computed in the addition unit. The equalizer is thus excellent in reproducibility of a transmission signal.

According to a second aspect of the present invention, an equalizer includes a low-pass filter, a subtraction unit and amplifier.

The low-pass filter receives a reception signal.

The subtraction unit subtracts from the reception signal an output signal from the low-pass filter.

The amplifier amplifies an output signal from the subtraction unit.

According to the second aspect of the present invention, a signal mainly composed of a high frequency component, obtained by subtracting from the reception signal the output signal from the low-pass filter, is amplified. Thus, as compared with the case of amplifying only the high frequency component of the reception signal and then adding the amplified signal to the reception signal, the low frequency component of the reception signal is also amplified in the equalizer of the second aspect. It is thereby possible to suppress a decrease in S/N ratio of the reception signal. Further, the equalizer of the second aspect adopts a low-pass filter rather than a high-pass filter. The low-pass filter is normally configured by a resistive element on a transmission path and a capacitive element suspended from one end of the resistive element, and one end of the resistive element on the transmission path is not insulated from the other end thereof. It is thereby possible to facilitate a disconnection test, by a direct current signal, on whether disconnection of the path among the reception end, the low-pass filter, the subtraction unit and the amplifier has not occurred. Furthermore, in the equalizer of the second aspect, the amplifier is arranged on the path subsequent to the subtraction unit. This prevents delay in a signal, which passes through the low-pass filter to reach the subtraction unit, due to the amplifier. Thereby, the simultaneity is easily maintained between the reception signal and the output signal from the low-pass filter which are computed in the subtraction unit. The equalizer is thus excellent in reproducibility of a transmission signal. Furthermore, since requiring no adder, the equalizer of the second aspect can exert the same effect as the equalizer of the first aspect with a simpler circuit configuration than the equalizer of the first aspect.

According to a third aspect of the present invention, an equalizer includes a signal conversion unit, a subtraction unit, an addition unit and amplifier.

The signal conversion unit converts a reception signal into a signal in direct proportion to the reception signal to output the converted signal.

The subtraction unit subtracts from the reception signal the output signal from the signal conversion unit.

The addition unit adds the reception signal to an output signal from the subtraction unit.

The amplifier amplifies an output signal from the addition unit.

An input/output gain of the signal conversion unit is constant in a region not higher than a predetermined frequency in a frequency band of a signal component contained in the reception signal, and gradually decreases in a region exceeding the predetermined frequency.

According to the third aspect of the present invention, an input/output gain of the signal conversion unit is constant in a region not higher than a predetermined frequency in a frequency band of a signal component contained in the reception signal, and gradually decreases in a region exceeding the predetermined frequency. Therefore, since the signal conversion unit serves an equivalent function to that of the low-pass filter, as in the case of the equalizer of the first aspect, the equalizer of the third aspect can suppress a decrease in S/N ratio of the reception signal. Further, as in the equalizer of the first aspect, there occurs no delay in the signal, which passes through the signal conversion unit and the subtraction unit to reach the addition unit, due to the amplifier. Thereby, the simultaneity is easily maintained between the reception signal and the output signal from the subtraction unit which are computed in the addition unit. The equalizer is thus excellent in reproducibility of a transmission signal. Moreover, it is also possible to convert the signal into a signal suitable for signal processing of the equalizer.

According to a fourth aspect of the present invention, an equalizer includes a signal conversion unit, a subtraction unit and an amplifier.

The signal conversion unit converts a reception signal into a signal in direct proportion to the reception signal to output the converted signal.

The subtraction unit subtracts from the reception signal the output signal from the signal conversion unit.

The amplifier amplifies an output signal from the addition unit.

An input/output gain of the signal conversion unit is constant in a region not higher than a predetermined frequency in a frequency band of a signal component contained in the reception signal, and gradually decreases in a region exceeding the predetermined frequency.

According to the fourth aspect of the present invention, an input/output gain of the signal conversion unit is constant in a region not higher than a predetermined frequency in a frequency band of a signal component contained in the reception signal, and gradually decreases in a region exceeding the predetermined frequency. Therefore, since the signal conversion unit serves an equivalent function to that of the low-pass filter, as in the case of the equalizer of the second aspect, the equalizer of the fourth aspect can suppress a decrease in S/N ratio of the reception signal. Further, as in the equalizer of the second aspect, there occurs no delay in the signal, which passes through the signal conversion unit to reach the subtraction unit, due to the amplifier. Thereby, the simultaneity is easily maintained between the reception signal and the output signal from the signal conversion unit which are computed in the subtraction unit. The equalizer is thus excellent in reproducibility of a transmission signal. The equalizer of the fourth aspect can exert the same effect as the equalizer of the first aspect with a simpler circuit configuration than the equalizer of the first aspect, as in the case of the equalizer of the second aspect. Moreover, it is also possible to convert the signal into a signal suitable for signal processing of the equalizer.

These and other objects, features, aspects and advantages of the present invention will become more apparent from the following detailed description of the present invention when taken in conjunction with the accompanying drawings.

BRIEF DESCRIPTION OF THE DRAWINGS

FIG. 11 shows one example of a detailed configuration of an amplifier pre-stage unit;

FIG. 12 shows another example of the detailed configuration of the amplifier pre-stage unit;

FIG. 15 is a graph showing the relation between a voltage signal to be inputted into the input end and each of voltages to be outputted in the voltage-voltage signal conversion unit;

FIG. 16 is a graph showing the relation between a frequency component contained in a voltage signal to be inputted into the input end and an input/output gain in the voltage-voltage signal conversion unit;

FIG. 24 is a circuit diagram showing an equalizer according to a sixth embodiment.

DESCRIPTION OF THE PREFERRED EMBODIMENTS

Principle

Prior to the description of an equalizer according to the present invention, the principle of the present invention is described with reference to FIGS. 1 to 4.

Figure 1:
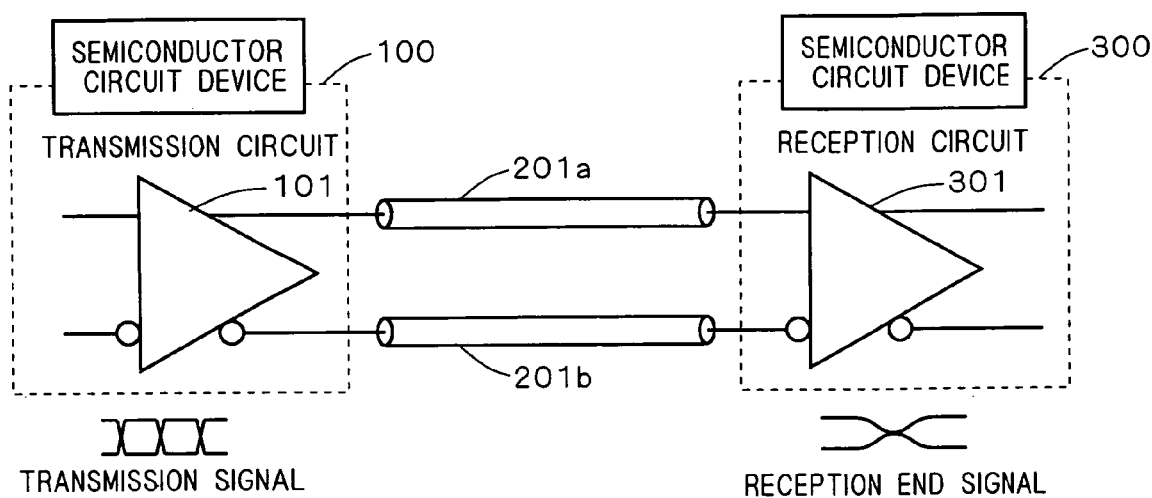
FIG. 1 shows a semiconductor circuit device including a transmission circuit and a semiconductor circuit device including a reception circuit, which are connected to each another through transmission paths.

FIG. 1 shows a semiconductor circuit device 100 including a transmission circuit 101 and a semiconductor circuit device 300 including a reception circuit 301, the devices being connected to each other through transmission paths 201a, 201b. It is to be noted that the semiconductor circuit devices 100 and 300 are, for example, semiconductor IC (Integrated Circuit) chips mounted on a print substrate (not shown), and the transmission paths 201a, 201b are, for example, printed wiring on the print substrate (not shown).

A positive logic signal and a negative logic signal in a complementary relation to the positive logic signal are outputted from the transmission circuit 101. The positive logic signal from the transmission circuit 101 is transmitted to the reception circuit 301 through the positive logic-side transmission path 201a. The negative logic signal from the transmission circuit 101 is transmitted to the reception circuit 301 through the negative logic-side transmission path 201b. The present invention is an equalizer to function as this reception circuit 301.

FIG. 1 shows a transmission signal (e.g., a signal of aligned information of "High"-"Low"-"High" . . . ) outputted from the transmission circuit 101, and a reception end signal received in the reception circuit 301. The waveform of the reception end signal appears to be dull owing to a noise or the like received on the transmission paths 201a and 201b.

Figure 2:
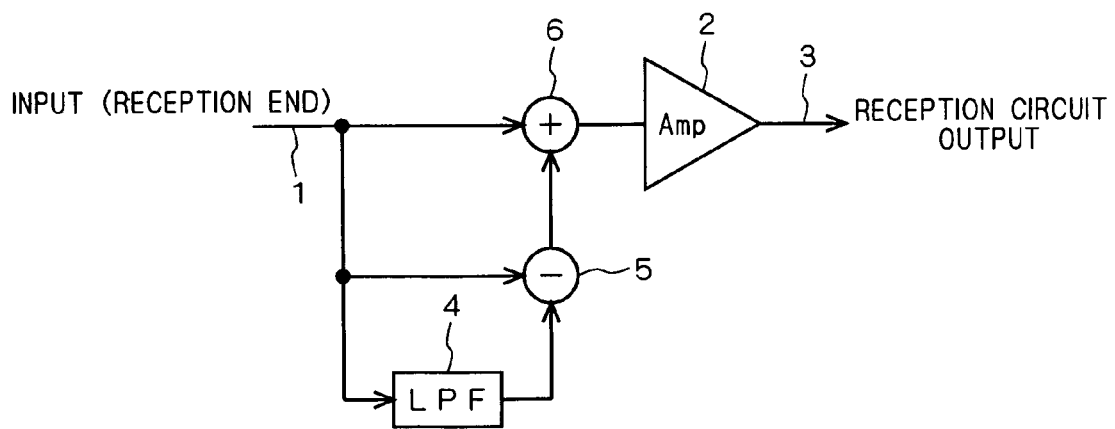
FIG. 2 is a circuit diagram showing a principle of an equalizer according to the present invention.

FIG. 2 is a circuit diagram showing the principle of the equalizer according to the present invention. As shown in FIG. 2, this equalizer includes a low-pass filter 4, a subtraction unit 5, an addition unit 6 and an amplifier 2.

Figure 3:
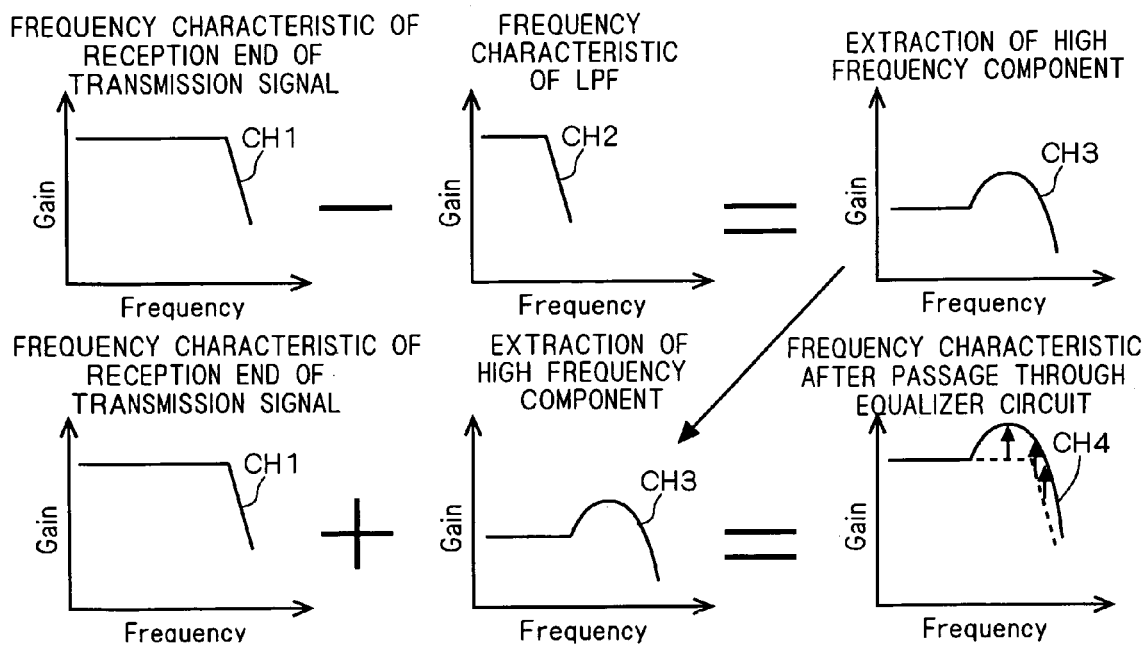
FIG. 3 is a Bode diagram showing an operational principle of the equalizer of FIG. 2.

Further, FIG. 3 is a Bode diagram showing the operational principle of the equalizer of FIG. 2. The operational principle of the equalizer according to the present invention is described using FIG. 3.

Receiving a reception signal (having a frequency characteristic shown with a graph of CH1 in FIG. 3) given from a reception end 1, the low-pass filter 4 outputs a signal (having a frequency characteristic shown with a graph of CH2 in FIG. 3) obtained by removing the high frequency component from the reception signal.

The subtraction unit 5 subtracts from the reception signal the output signal from the low-pass filter 4. Thereby, an output signal from the subtraction unit 5 has a frequency characteristic shown with a graph of CH3 in FIG. 3.

The addition unit 6 adds a reception signal from the reception end 1 to the output signal from the subtraction unit 5. With this addition, an output signal from the addition unit 6 has a frequency characteristic of emphasizing the high frequency component as shown with a graph of CH4 in FIG. 3. Subsequently, the amplifier 2 amplifies the output signal from the addition unit 6, and transmits it to an output end 3.

As thus described, according to the equalizer shown in FIG. 2, a signal (CH3) mainly composed of a high frequency component, obtained by subtracting an output signal (CH2) from the low-pass filter 4 from a reception signal (CH1) is added to the reception signal (CH1), and the signal (CH4) after addition is amplified. As compared with an equalizer where only the high frequency component of the reception signal is amplified and the amplified signal is added to the reception signal as in the above-described technique of Japanese Patent Application Laid-Open No. 2004-120468, the low frequency component of the reception signal (CH1) is amplified as well as the high frequency component (CH3) in the equalizer of FIG. 2. It is thereby possible to suppress a decrease in S/N ratio of the reception signal.

Further, the equalizer of FIG. 2 adopts the low-pass filter 4 rather than a high-pass filter. The low-pass filter is normally configured by a resistive element on a transmission path and a capacitive element suspended from one end of the resistive element, and one end of the resistive element on the transmission path is not insulated from the other end thereof. It is thereby possible to facilitate a disconnection test, by a direct current signal, on whether disconnection of the path among the reception end 1, the low-pass filter 4, the subtraction unit 5, the addition unit 6 and the amplifier 2 has not occurred.

Furthermore, in the equalizer of FIG. 2, the amplifier 2 is arranged on the path subsequent to the addition unit 6. This prevents delay in a signal, which passes through the low-pass filter 4 and the subtraction unit 5 to reach the addition unit 6, due to the amplifier 2. Thereby, the simultaneity is easily maintained between the reception signal from the reception end 1 and the output signal from the subtraction unit 5 which are computed in the addition unit 6. The equalizer is thus excellent in reproducibility of a transmission signal.

Figure 4:
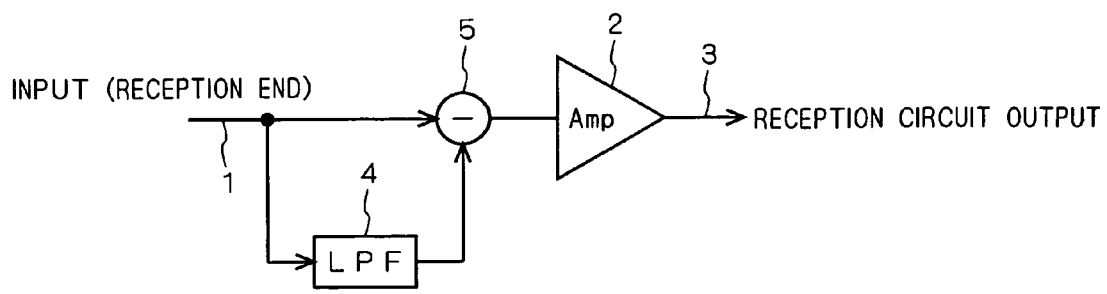
FIG. 4 is a circuit diagram showing an equalizer capable of realizing an equivalent function to that of the equalizer of FIG. 2 with a simpler configuration than the equalizer of FIG. 2.

It is to be noted that FIG. 4 shows an equalizer capable of realizing an equivalent function to that of the equalizer of FIG. 2 with a simpler configuration than the equalizer of FIG. 2. As shown in FIG. 4, this equalizer includes the low-pass filter 4, the subtraction unit 5 and the amplifier 2 having the configuration of the equalizer of FIG. 2 with the addition unit 6 omitted therefrom.

Also in the equalizer of FIG. 4, the low-pass filter 4 receives a signal (graph of CH1 in FIG. 3) given from the reception end 1 and outputs a signal (graph of CH2 in FIG. 3) obtained by removing the high frequency component from the reception signal. However, a value of an input/output gain in a pass band in the low-pass filter 4 is set to a value less than one time.

The subtraction unit 5 subtracts from the reception signal the output signal from the low-pass filter 4. Thereby, the output signal from the subtraction unit 5 has a frequency characteristic shown with the graph of CH3 in FIG. 3. However, since the value of the input/output gain of the pass band in the low-pass filter 4 is smaller than one time, the low frequency component is not completely lost in the output signal from the subtraction unit 5. Consequently, the output signal from the subtraction unit 5 has a frequency characteristic of emphasizing the high frequency component.

The amplifier 2 then amplifies the output signal from the subtraction unit 5, and transmits it to the output end 3.

As seen from the graphs of CH3 and CH4 in FIG. 3, so long as the low frequency component is not completely lost, it is possible to obtain the graph of CH4 by amplifying the graph of CH3 without addition of the graph of CH3 to the graph of CH1.

Hence, with the output signal from the subtraction unit 5 directly amplified with the amplifier 2, a signal component other than the high frequency component as the main component is also amplified, without addition of the reception signal from the addition unit 6 to the output signal from the subtraction unit 5.

Namely, as compared with an equalizer where only the high frequency component of the reception signal is amplified and the amplified signal is added to the reception signal as in the above-described technique of Japanese Patent Application Laid-Open No. 2004-120468, the low frequency component of the reception signal is amplified as well as the high frequency component in the equalizer of FIG. 4, as in the equalizer of FIG. 2. It is thereby possible to suppress a decrease in S/N ratio of the reception signal.

Further, the equalizer of FIG. 4 also adopts the low-pass filter 4 rather than a high-pass filter. It is thereby possible to facilitate a disconnection test, by a direct current signal, on whether disconnection of the path among the reception end 1, the low-pass filter 4, the subtraction unit 5 and the amplifier 2 has not occurred.

Further, also in the equalizer of FIG. 4, the amplifier 2 is arranged on the path subsequent to the subtraction unit 5. This prevents delay in a signal, which passes through the low-pass filter 4 to reach the subtraction unit 5, due to the amplifier 2. Thereby, the simultaneity is easily maintained between the reception signal from the reception end 1 and the output signal from the low-pass filter 4 which are computed in the subtraction unit 5. The equalizer is thus excellent in reproducibility of a transmission signal.

Furthermore, since not requiring the addition unit 6, the equalizer of FIG. 4 can exert the same effect as the equalizer of FIG. 2 with a simpler circuit configuration than the equalizer of FIG. 2.

In the following first to fourth embodiments, more specific description of the circuit configuration is given based upon the equalizer of FIG. 4.

First Embodiment

Figure 5:
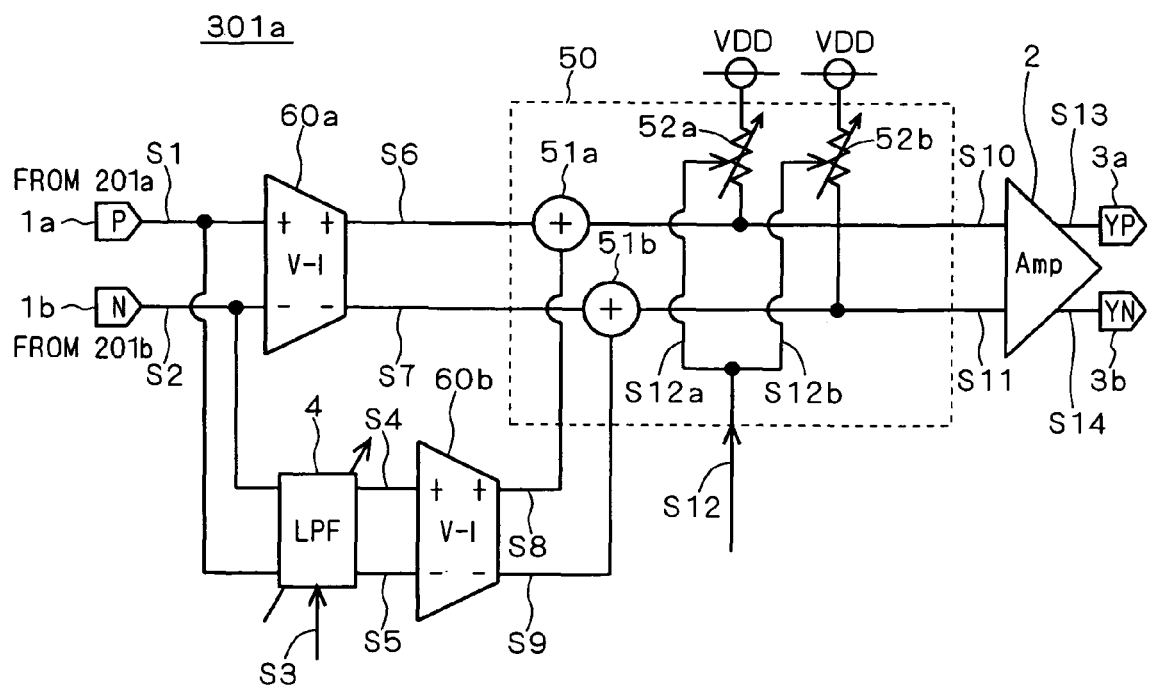
FIG. 5 is a circuit diagram showing an equalizer according to a first embodiment.

FIG. 5 is a circuit diagram showing an equalizer according to this embodiment, which functions as a reception circuit 301a. This equalizer also includes the low-pass filter 4 and the amplifier 2 which are shown in FIG. 4. Further, adders 51a, 51b which are shown in FIG. 5 correspond to the addition unit 5 of FIG. 4. Moreover, the equalizer of FIG. 5 includes voltage-current signal conversion units 60a, 60b, and resistors 52a, 52b. It is to be noted that the adders 51a, 51b and the resistors 52a, 52b configure an amplifier pre-stage unit 50.

In this embodiment, for the purpose of specifically showing a transmission path for a positive logic signal and a transmission path for a negative logic signal, a reception end 1a for receiving a voltage signal of a positive logic and a reception end 1b for receiving a voltage signal of a negative logic are clearly specified. In correspondence to these reception ends, two respective signal paths arranged after the reception ends are shown with two lines.

In FIG. 5, a voltage signal S1 of the positive logic and a voltage signal S2 of the negative logic, which are received at the reception ends 1a, 1b, respectively, are inputted into the low-pass filter 4, and also inputted into the voltage-current signal conversion unit 60a.

The voltage-current signal conversion unit 60a converts the received voltage signals S1, S2 into current signals S6, S7 in direct proportion to the voltage signals, and the converted signals are respectively outputted to the adders 51a, 51b as the subtraction unit 5.

Further, the voltage-current signal conversion unit 60b converts output voltage signals S4, S5 from the low-pass filter 4 into current signals S8, S9 in direct proportion to the output voltage signals, and the converted current signals S8, S9 are respectively outputted to the adders 51a, 51b as the subtraction unit 5.

In the adder 51a, the current signal S6 of the positive logic from the voltage-current signal conversion unit 60a is added to the current signal S8 from the voltage-current signal conversion unit 60b. In the adder 51b, the current signal S7 of the negative logic from the voltage-current signal conversion unit 60a is added to the current signal S9 from the voltage-current signal conversion unit 60b.

It is described here that the adders 51a, 51b function as the subtraction unit. At the input ends of the voltage-current signal conversion unit 60b, the voltage signal S1 of the positive logic and the voltage signal S2 of the negative logic, having passed through the low-pass filter 4 and reversed in polarity, are respectively inputted as the voltage signals S5, S4 into the positive signal input end (indicated as "+") and the negative signal input end (indicated as "−").

Since the positive logic and the negative logic of the converted current signals S9, S8 do not differ from those of the voltage signals S5, S4 before conversion, eventually, the current signal S6 of the positive logic is added to the current signal S8 of the negative logic, while the current signal S7 of the negative logic is added to the current signal S9 of the positive logic. Namely, such additions correspond to subtractions of signals S5, S4 after passage through the low-pass filter 4 respectively from the received voltage signals S1, S2.

In the adders 51a, 51b, as described later, the current signals are reconverted into voltage signals S10, S11. Then, the voltage signals S10, S11 are respectively inputted into the input ends of the amplifier 2. Output signals S13, S14 from the amplifier 2 are respectively given to output ends 3a, 3b.

It is to be noted that one ends of the resistors 52a, 52b are connected to the input ends of the amplifier 2, and a power supply potential VDD is supplied to the other ends of the resistors 52a, 52b.

With such resistors 52a, 52b introduced, values of the resistors 52a, 52b are appropriately set so as to adjust the strengths of the signals to be inputted into the amplifier 2. Hence it is possible to set a frequency characteristic of the equalizer according to a characteristic of the transmission path for the reception signal.

Figure 6:
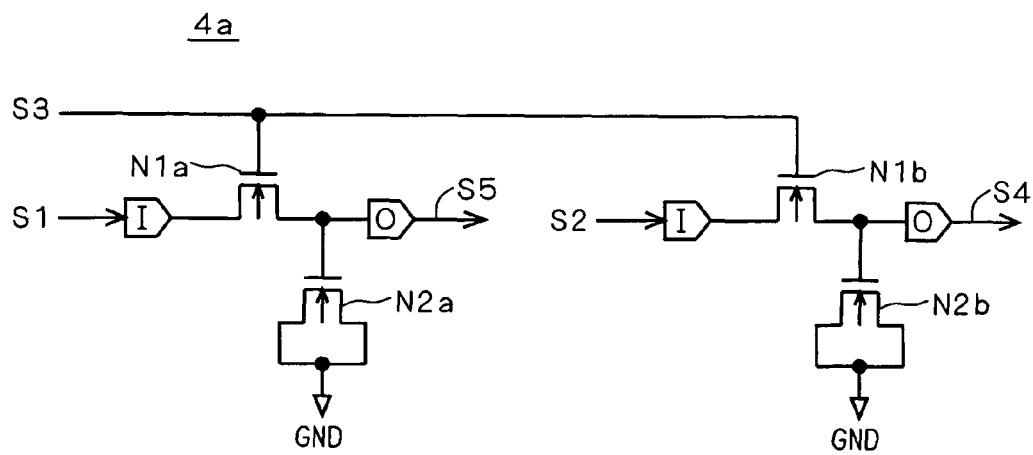
FIG. 6 shows one example of a detailed configuration of a low-pass filter.

FIG. 6 shows one example of a specific configuration of the low-pass filter 4. It should be noted that the low-pass filter of FIG. 6 is differentiated by provision of a symbol "4a".

The low-pass filter 4a is configured by four Nch-MOS transistors (N-channel metal oxide semiconductor transistor) N1a, N2a, N1b, N2b.

The voltage signal S1 of the positive logic is given to one of a drain and a source of the Nch-MOS transistor N1a. Further, the voltage signal S2 of the negative logic is given to one of a drain and a source of the Nch-MOS transistor N1b.

The other one of the drain and the source of the Nch-MOS transistor N1a outputs the voltage signal S5 of the positive logic. Further, the other one of the drain and the source of the Nch-MOS transistor N1a is connected to a gate of the Nch-MOS transistor N2a. The other one of the drain and the source of the Nch-MOS transistor N1b outputs the voltage signal S4 of the negative logic. Further, the other one of the drain and the source of the Nch-MOS transistor N1b is connected to a gate of the Nch-MOS transistor N2b.

Further, a source and a drain of the Nch-MOS transistor N2a are short-circuited, and supplied with a ground potential GND. Similarly, a source and a drain of the Nch-MOS transistor N2b are short-circuited, and supplied with a ground potential GND.

The voltage signal S3 is given from the outside to the gates of the Nch-MOS transistors N1a and N1b. The strength of the voltage signal S3 is variable in the triode region (linear region) of the Nch-MOS transistors N1a and N1b.

With the above-mentioned connection configuration, both the Nch-MOS transistors N2a and N2b function as capacitive elements, and both the Nch-MOS transistors N1a and N1b function as variable resistive elements. Namely, the low-pass filter 4a is a typical low-pass filter configured by a resistive element on a transmission path and a capacitive element suspended from one end of the resistive element.

As thus described, when the strength of the voltage signal S3 is variable in the triode region of the Nch-MOS transistors N1a and N1b, a cutoff frequency of the low-pass filter 4a is variable.

Accordingly, appropriate setting of the value of the cutoff frequency of the low-pass filter 4a allows adjustment of the strengths of the signals S10, S11 to be inputted into the amplifier 2, and it is thus possible to set the frequency characteristic of the equalizer according to characteristics of the transmission paths 201a, 201b for the reception signals.

Figure 7:
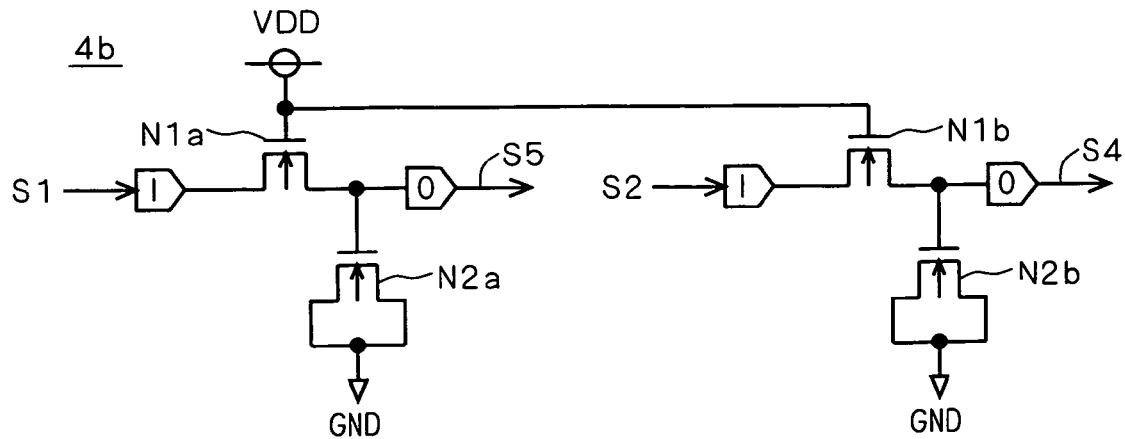
FIG. 7 shows another example of the detailed configuration of the low-pass filter.

It is to be noted that FIG. 7 shows another example of the detailed configuration of the low-pass filter 4. The low-pass filter of FIG. 7 is differentiated by provision of a symbol "4b".

In the low-pass filter 4b, the power supply potential VDD is given, in place of the voltage signal S3, to the gate of the Nch-MOS transistors N1a, N1b. Except for this respect, the low-pass filter 4b has the same configuration as the low-pass filter 4a of FIG. 6.

Namely, in the low-pass filter 4b of FIG. 7, a cutoff frequency is a fixed value. Therefore, appropriate designing of the gate size, an injection amount of the impurity in the channel region, and the like in terms of the Nch-MOS transistors N1a, N1b enables configuration of a control-free low-pass filter.

Figure 8:
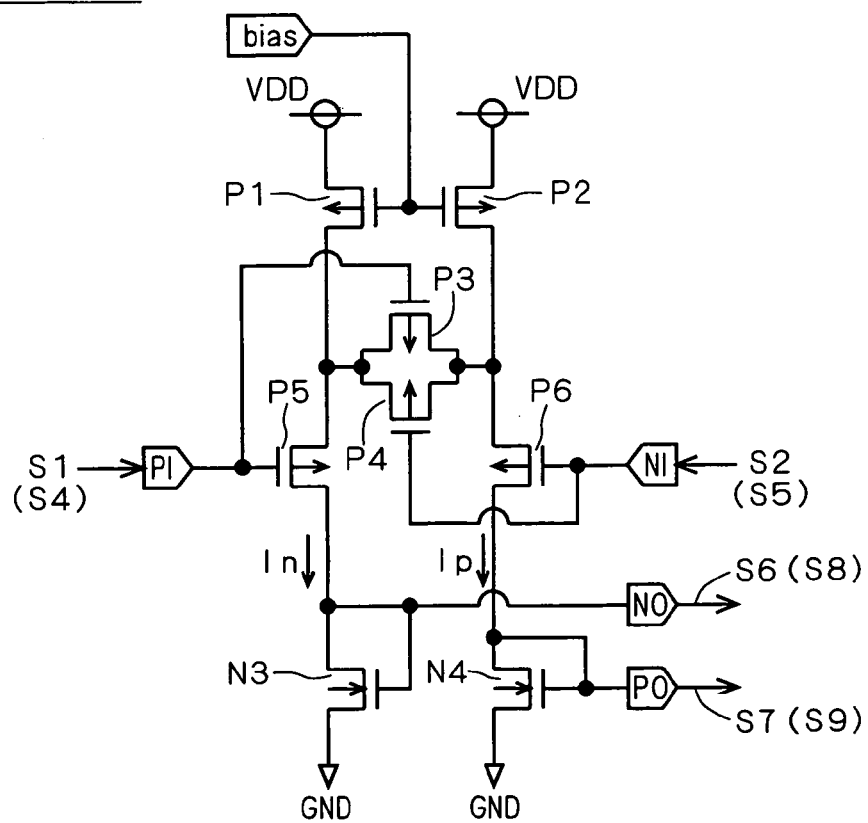
FIG. 8 shows one example of a detailed configuration of a voltage-current signal conversion unit.

FIG. 8 shows one example of a detailed configuration of the voltage-current signal conversion unit 60a capable of converting the received voltage signals S1, S2 into the current signals S6, S7 in direct proportion to the voltage signals, and the voltage-current signal conversion unit 60b capable of converting the received voltage signals S4, S5 into the current signals S8, S9 in direct proportion to the voltage signals.

It should be noted that an input/output gain of the voltage-current signal conversion unit 60a is constant in a frequency band of a signal component contained in the received voltage signals S1, S2, and the input/output gain of the voltage-current signal conversion unit 60b is constant in a frequency band of a signal component contained in the received voltage signals S4, S5.

Moreover, the voltage-current signal conversion units 60a, 60b have an equivalent circuit configuration except for the following differences. The input signals are the signals S1, S2 and the output signals are the current signals S6, S7 in the voltage-current signal conversion unit 60a, whereas the input signals are the voltage signals S4, S5 and the output signals are the current signals S8, S9 in the voltage-current signal conversion unit 60b. Therefore, only the circuit configuration of the voltage-current signal conversion unit 60a is shown in FIG. 8, with each signal in the case of the circuit configuration of the voltage-current signal conversion unit 60b shown in parenthesis. Also in the following description, each signal in the case of the voltage-current signal conversion unit 60b is shown in parenthesis, as in FIG. 8.

The voltage-current signal conversion unit 60a (60b) is configured by six Pch-MOS transistors P1 to P6 and two Nch-MOS transistors N3, N4.

The voltage signal S1 of the positive logic (the voltage signal S4 of the negative logic) is given to a gate of the Pch-MOS transistor P5. Further, the voltage signal S2 of the negative logic (the voltage signal S5 of the positive logic) is given to a gate of the Pch-MOS transistor P6.

A drain of the Pch-MOS transistor P1 is connected to a source of the Pch-MOS transistor P5. Further, a drain of the Pch-MOS transistor P2 is connected to a source of the Pch-MOS transistor P6. The power supply potential VDD is supplied to both sources of the Pch-MOS transistors P1 and P2. A bias potential "bias" is supplied to both gates of the Pch-MOS transistors P1, P2.

A drain of the Pch-MOS transistor P3 is connected to a drain of the Pch-MOS transistor P4 and, also, to the source of the Pch-MOS transistor P5. Further, a source of the Pch-MOS transistor P3 is connected to a source of the Pch-MOS transistor P4 and, also, to the source of the Pch-MOS transistor P6.

A gate of the Pch-MOS transistor P3 is connected to the gate of the Pch-MOS transistor P5, and a gate of the Pch-MOS transistor P4 is connected to a gate of the Pch-MOS transistor P6.

The drain of the Pch-MOS transistor P5 is connected to a drain of the Nch-MOS transistor N3 and, also, to a gate of the Nch-MOS transistor N3. Further, a drain of the Pch-MOS transistor P6 is connected to a drain of the Nch-MOS transistor N4 and, also, to a gate of the Nch-MOS transistor N4. The ground potential GND is supplied to both sources of the Nch-MOS transistors N3, N4.

Respective currents In, Ip in the drains of the Nch-MOS transistors N3, N4 are current signals S6 (S8), S7 (S9) as output signals from the voltage-current signal conversion unit 60a (60b).

Figure 9:
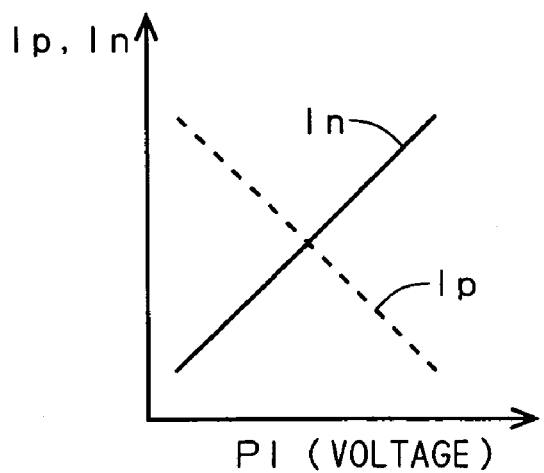
FIG. 9 is a graph showing the relation between a voltage signal to be inputted into an input end and each of current signals to be outputted in the voltage-current signal conversion unit.

FIG. 9 is a graph showing the relation between the voltage signal S1 (S4) to be inputted into an input end PI and each of the currents In, Ip, i.e., the current signals S6 (S8), S7 (S9), in the voltage-current signal conversion unit 60a (60b).

With the circuit configuration of FIG. 8 adopted, the gate size, an injection amount of the impurity in the channel region, and the like, in terms of the Pch-MOS transistors P1 to P6 and Nch-MOS transistors N3, N4, are appropriately designed so as to obtain the currents In, Ip, i.e., the current signals S6 (S8), S7 (S9), in direct proportion to the voltage signal S1 (S4), as shown in FIG. 9.

It is to be noted that the relation between the voltage signal S2 (S5) to be inputted into an input end NI and each of the currents In, Ip, i.e., the current signals S6 (S8), S7 (S9), is the same as the relation shown in FIG. 9.

Figure 10:
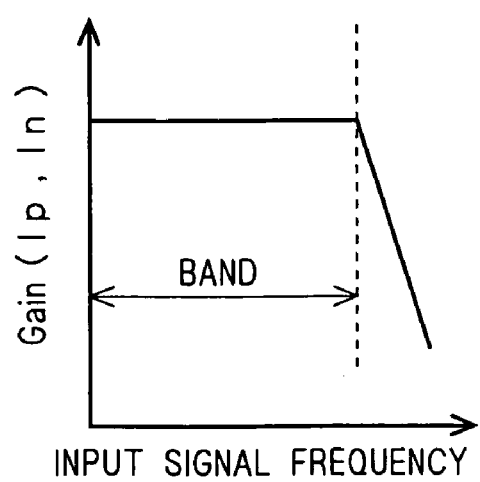
FIG. 10 is a graph showing the relation between a frequency component contained in a voltage signal to be inputted into the input end and an input/output gain in the voltage-current signal conversion unit.

FIG. 10 is a graph showing the relation between a frequency component contained in the voltage signals S1 (S4), S2 (S5), and an input/output gain between the voltage signals S1 (S4), S2 (S5) and the current signals S6 (S8), S7 (S9), in the voltage-current signal conversion unit 60a (60b).

With the circuit configuration of FIG. 8 adopted, the gate size, an injection amount of the impurity in the channel region, and the like, in terms of the Pch-MOS transistors P1 to P6 and the Nch-MOS transistors N3, N4, are appropriately designed so as to keep the input/output gain of the voltage-current signal conversion unit 60a (60b) constant in a frequency band of a signal component contained in the received voltage signals S1 (S4), S2 (S5), as shown in FIG. 10.

As thus described, the voltage-current signal conversion unit 60a (60b) converts the voltage signals S1 (S4), S2 (S5) to be inputted, in a state where the input/output gain is constant in a frequency band of a signal component contained in the voltage signals S1 (S4), S2 (S5), into the current signals S6 (S8), S7 (S9), and then outputs the converted current signals S6 (S8), S7 (S9).

Accordingly, even when the operating power supply voltage of the equalizer is small, a reception signal can be reduced to a signal suitable for the operating power supply voltage, and thus the reception signal can be converted into a signal suitable for signal processing in the equalizer. Alternatively, even when the amplitude of a reception signal is small and thus monotonous, the signal can be magnified to a signal with a large amplitude, and thus can be converted into a signal suitable for signal processing in the equalizer.

FIG. 11 shows the detailed configuration of the amplifier pre-stage unit 50. It is to be noted that the amplifier pre-stage unit of FIG. 11 is differentiated by provision of a symbol "50a".

The amplifier pre-stage unit 50a is configured by two groups each including two Pch-MOS transistors P7a, P7b and four Nch-MOS transistors N5a, N6a, N5b, N6b. Among them, two groups each including the Pch-MOS transistors P7a, P7b and the Nch-MOS transistors N5a, N5b, configure the resistors 52a, 52b, while two groups each including the Nch-MOS transistors N6a, N6b configure the adders 51a, 51b.

It should be noted that the adder 51a adds the current signal S6 to the current signal S8, and reconverts the addition result into the voltage signal S10, to be outputted. Further, the adder 51b adds the current signal S7 to the current signal S9, and reconverts the addition result into the voltage signal S11, to be outputted.

Further, the resistors 52a, 52b have an equivalent circuit configuration, and the adders 51a, 51b have an equivalent circuit configuration, except for the following differences. The input signals are the current signals S6, S8 and the output signal is the voltage signal S10 in the resistor 52a and the adder 51a, whereas the input signals are the current signals S7, S9 and the output signal is the voltage signal S11 in the resistor 52b and the adder 51b. Therefore, only the circuit configurations of the resistor 52a and the adder 51a are shown in FIG. 11, with each signal in the case of the circuit configuration of the resistor 52b and the adder 51b shown in parenthesis. Also in the following description, respective signals in the case of the resistor 52b and the adder 51b are shown in parenthesis, as in FIG. 11.

The current signal S6 of the positive logic (current signal S7 of the negative logic) is given to a gate of the Nch-MOS transistor N6a. Further, the current signal S8 of the negative logic (the current signal S9 of the positive logic) is given to a gate of the Nch-MOS transistor N6b. The ground potential GND is supplied to both sources of the Nch-MOS transistors N6a, N6b.

A drain of the Nch-MOS transistor N6a is connected to a source of the Nch-MOS transistor N5a while a source of the Nch-MOS transistor N5b is connected to a drain of the Nch-MOS transistor N6b. Further, a drain of the Pch-MOS transistor P7a is connected to a drain of the Nch-MOS transistor N5a while a drain of the Pch-MOS transistor N7b is connected to a drain of the Nch-MOS transistor N5b. Moreover, the power supply potential VDD is supplied to both sources of the Pch-MOS transistors P7a, P7b.

Drains of the Pch-MOS transistors P7a, P7b are also connected to each other, and a voltage at this node is the voltage signal S10 (S11) as an output signal from the amplifier pre-stage unit 50a to the amplifier 2.

The voltage signal S12a (S12b) is given from the outside to gates of the Pch-MOS transistors P7a and P7b. Moreover, a voltage signal /S12a (/S12b) as a reversed signal of the voltage signal S12a (S12b) is also given from the outside to gates of the Nch-MOS transistors N5a and N5b. The strengths of the voltage signals S12a (S12b), /S12a (/S12b) are variable in the triode region (linear region) of the Pch-MOS transistors P7a and P7b as well as the Nch-MOS transistors N5a and N5b. It is to be noted that the voltage signal S12 is composed of the voltage signals S12a and S12b.

According to the above-mentioned connection configuration, when the strengths of the voltage signal S12a (S12b), /S12a (/S12b) are variable in the triode region of the Pch-MOS transistors P7a and P7b as well as the Nch-MOS transistors N5a and N5b, resistance values of the resistors 52a, 52b are variable.

Accordingly, appropriate setting of the resistance values of the variable resistors 52a, 52b allows adjustment of the strengths of the signals S10, S11 to be inputted into the amplifier 2, and it is thus possible to set the frequency characteristic of the equalizer according to characteristics of the transmission paths 201a, 201b for the reception signals.

It is to be noted that FIG. 12 shows another example of the detailed configuration of the amplifier pre-stage unit 50. The amplifier pre-stage unit of FIG. 12 is differentiated by provision of a symbol "50b".

In the amplifier pre-stage unit 50b, the Nch-MOS transistors N5a and N5b in the amplifier pre-stage unit 50a of FIG. 11 are omitted. The drain of the Nch-MOS transistor N6a is directly connected with the drain of the Pch-MOS transistor P7a, and the drain of the Nch-MOS transistor N6b is directly connected with the drain of the Pch-MOS transistor P7b.

Further, the ground potential GND is supplied, in place of the voltage signal S12a, to the gates of the Pch-MOS transistors P7a and P7b. The Pch-MOS transistors P7a and P7b configure a resistor 52c (52d), and the Nch-MOS transistors N6a and N6b configure an adder 51c (51d).

Except for these respects, the amplifier pre-stage unit 50b of FIG. 12 has the same configuration as the amplifier pre-stage unit 50a of FIG. 11.

Namely, in the amplifier pre-stage unit 50b of FIG. 12, resistance values of the resistors 52c, 52d are fixed values. Therefore, appropriate designing of the gate size, an injection amount of the impurity in the channel region, and the like in terms of the Pch-MOS transistors P7a and P7b enables configuration of a control-free resistor.

Second Embodiment

A second embodiment is a modification of the equalizer according to the first embodiment, obtained by omitting the low-pass filter 4 in the first embodiment and instead providing a low-pass filter function to the voltage-current signal conversion unit 60b.

As shown in FIG. 10, appropriate designing of the gate size, an injection amount of the impurity in the channel region, and the like in terms of the Pch-MOS transistors P1 to P6 and Nch-MOS transistors N3, N4 which configure the voltage-current signal conversion unit 60b can keep the input/output gain of the voltage-current signal conversion unit 60a (60b) constant in a frequency band of a signal component contained in the received voltage signals S1 (S4), S2 (S5).

In this embodiment, the gate size, an injection amount of the impurity in the channel region, and the like in terms of each MOS transistor of the voltage-current signal conversion unit 60b are designed such that the input/output gain of the voltage-current signal conversion unit 60b is constant in a region not higher than a predetermined frequency in the frequency band of the signal component contained in the received voltage signals S4, S5, and gradually decreases in a region exceeding the predetermined frequency.

Descriptions of the other respects are omitted since those respects are the same as in the case of the equalizer according to the first embodiment.

According to this embodiment, since the voltage-current signal conversion unit 60b serves an equivalent function to the low-pass filter 4, it is possible to suppress a decrease in S/N ratio of the reception signal, as in the case of the equalizer according to the first embodiment.

Further, as in the case of the equalizer according to the first embodiment, there occurs no delay in the signal, which passes through the voltage-current signal conversion unit 60b to reach the subtraction unit 5, due to the amplifier 2, thereby making it easy to maintain the simultaneity between the reception signal and the output signal from the voltage-current signal conversion unit 60b which are computed in the subtraction unit 5. The equalizer of this embodiment is thus excellent in reproducibility of a transmission signal.

Further, as in the case of the equalizer of FIG. 4, the equalizer according to this embodiment can exert the same effect as the equalizer of FIG. 2 with a simpler circuit configuration than the equalizer of FIG. 2. Moreover, the equalizer can convert the signal into a signal suitable for signal processing of the equalizer by means of the voltage-current signal conversion unit 60b.

Third Embodiment

A third embodiment is also a modification of the equalizer according to the first embodiment, where voltage-voltage signal conversion units are adopted in place of the voltage-current signal conversion units 60a, 60b in the first embodiment.

Figure 13:
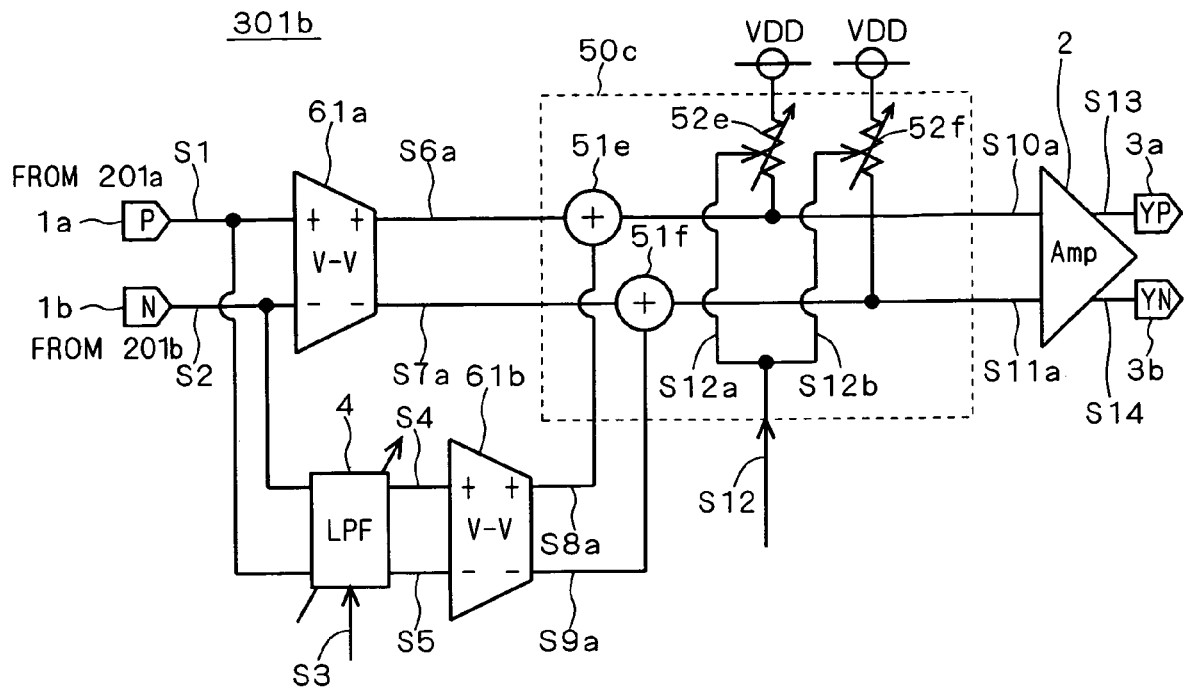
FIG. 13 is a circuit diagram showing an equalizer according to a third embodiment.

FIG. 13 is a circuit diagram showing the equalizer according to this embodiment which functions as a reception circuit 301b. This equalizer also includes adders 51e, 51f similar to the adders 51a, 51b, resisters 52e, 52f similar to the resistors 52a, 52b, the low-pass filter 4, and the amplifier 2. It should be noted that the adders 51e, 51f and the resistors 52e, 52f configure an amplifier pre-stage unit 50c.

However, the equalizer of FIG. 13 includes voltage-voltage signal conversion units 61a, 61b in place of the voltage-current signal conversion units 60a, 60b.

The voltage-voltage signal conversion unit 61a converts the received voltage signals S1, S2 into voltage signals S6a, S7a in direct proportion to the received voltage signals, and outputs the converted signals respectively to the adders 51e, 51f as the subtraction unit 5.

Further, the voltage-voltage signal conversion unit 61b converts the output voltage signals S4, S5 from the low-pass filter 4 into voltage signals S8a, S9a in direct proportion to the output voltage signals, and outputs the converted signals S8a, S9a respectively to the adders 51e, 51f as the subtraction unit 5.

In the adder 51e, a voltage signal S6a of the positive logic from the voltage-voltage signal conversion unit 61a is added to a voltage signal S8a from the voltage-voltage signal conversion unit 61b. In the adder 51f, while a voltage signal S7a of the negative logic from the voltage-voltage signal conversion unit 61a is added to a voltage signal S9a from the voltage-voltage signal conversion unit 61b.

Voltage signals S10a, S11a as the addition results are outputted from the adders 51e, 51f. The voltage signals S10a, S11a are respectively inputted into the input ends of the amplifier 2. The output signals S13, S14 from the amplifier 2 are respectively given to the output ends 3a, 3b.

It is to be noted that one ends of the resistors 52e, 52f are connected to the input ends of the amplifier 2, and the power supply potential VDD is supplied to the other ends of the resistors 52e, 52f.

Figure 14:
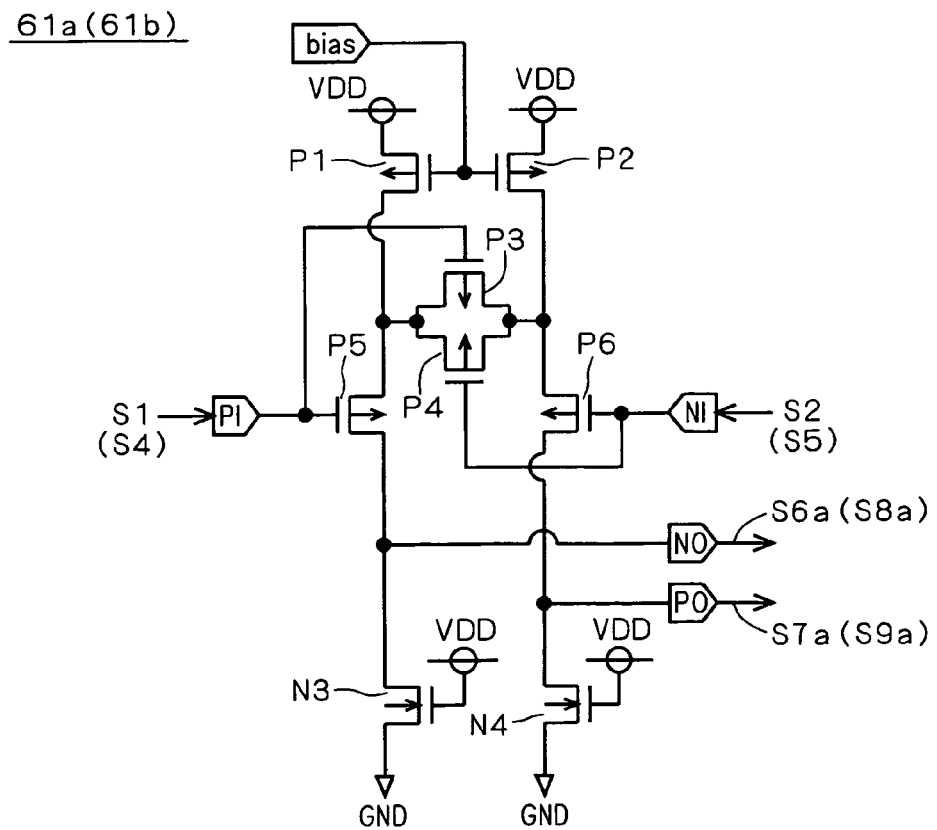
FIG. 14 shows one example of a detailed configuration of a voltage-voltage signal conversion unit.

FIG. 14 shows one example of a detailed configuration of the voltage-voltage signal conversion unit 61a capable of converting the received voltage signals S1, S2 into the voltage signals S6a, S7a in direct proportion to the received voltage signals, and the voltage-voltage signal conversion unit 61b positive logic) is given to a gate of the Pch-MOS transistor P6.

A drain of the Pch-MOS transistor P1 is connected to a source of the Pch-MOS transistor P5. Further, a drain of the Pch-MOS transistor P2 is connected to a source of the Pch-MOS transistor P6. The power supply potential VDD is supplied to both sources of the Pch-MOS transistors P1 and P2. The bias potential "bias" is supplied to both gates of the Pch-MOS transistors P1, P2.

A drain of the Pch-MOS transistor P3 is connected to a drain of the Pch-MOS transistor P4 and, also, to the source of the Pch-MOS transistor P5. Further, a source of the Pch-MOS transistor P3 is connected to a source of the Pch-MOS transistor P4 and, also, to the source of the Pch-MOS transistor P6.

A gate of the Pch-MOS transistor P3 is connected to a gate of the Pch-MOS transistor P5, and a gate of the Pch-MOS transistor P4 is connected to a gate of the Pch-MOS transistor P6.

A drain of the Pch-MOS transistor P5 is connected to a drain of the Nch-MOS transistor N3. The power supply potential VDD is supplied to a gate of the Nch-MOS transistor N3. A drain of the Pch-MOS transistor P6 is connected to a drain of the Nch-MOS transistor N4. The power supply potential VDD is supplied to a gate of the Nch-MOS transistor N4. The ground potential GND is supplied to both sources of the Nch-MOS transistors N3, N4.

Respective voltages NO, PO in the drains of the Nch-MOS transistors N3, N4 are voltage signals S6a (S8a), S7a (S9a) as output signals from the voltage-voltage signal conversion unit 61a (61b), capable of converting the received voltage signals S4, S5 into the voltage signals S8a, S9a in direct proportion to the received voltage signals.

It should be noted that an input/output gain of the voltage-voltage signal conversion unit 61a is constant in a frequency band of a signal component contained in the received voltage signals S1, S2, and the input/output gain of the voltage-voltage signal conversion unit 61b is constant in a frequency band of a signal component contained in the received voltage signals S4, S5.

Moreover, the voltage-voltage signal conversion units 61a, 61b have an equivalent circuit configuration except for the following differences. The input signal are the voltage signals S1, S2 and the output signals are the voltage signals S6a, S7a in the voltage-voltage signal conversion unit 61a, whereas the input signals are the voltage signals S4, S5 and the output signals are the voltage signals S8a, S9a in the voltage-voltage signal conversion unit 61b. Therefore, only the circuit configuration of the voltage-voltage signal conversion unit 61a is shown in FIG. 14, with each signal in the case of the circuit configuration of the voltage-voltage signal conversion unit 61b shown in parenthesis. Also in the following description, each signal in the case of the voltage-voltage signal conversion unit 61b is shown in parenthesis, as in FIG. 14.

The voltage-voltage signal conversion unit 61a (61b) is configured by six Pch-MOS transistors P1 to P6 and two Nch-MOS transistors N3, N4.

The voltage signal S1 of the positive logic (voltage signal S4 of the negative logic) is given to a gate of the Pch-MOS transistor P5. Further, the voltage signal S2 of the negative logic (the voltage signal S5 of the FIG. 15 is a graph showing the relation between the voltage signal S1 (S4) to be inputted into the input end PI and each of the voltages NO, PO, i.e., the voltage signals S6a (S8a), S7a (S9a), in the voltage-voltage signal conversion unit 61a (61b).

With the circuit configuration of FIG. 14 adopted, the gate size, an injection amount of the impurity in the channel region, and the like, in terms of the Nch-MOS transistors N3, N4 and the Pch-MOS transistors P1 to P6, are appropriately designed so as to obtain the voltages NO, PO, i.e., the voltage signals S6a (S8a), S7a (S9a), in direct proportion to the voltage signal S1 (S4), as shown in FIG. 15.

It is to be noted that the relation between the voltage signal S2 (S5) to be inputted into the input end NI and each of the voltages NO, PO, i.e., the voltage signals S6a (S8a), S7a (S9a), is the same as the relation shown in FIG. 15.

FIG. 16 is a graph showing the relation between a frequency component contained in the voltage signals S1 (S4), S2 (S5), and an input/output gain between the voltage signals S1 (S4), S2 (S5) and the voltage signals S6a (S8a), S7a (S9a), in the voltage-voltage signal conversion unit 61a (61b).

With the circuit configuration of FIG. 14 adopted, the gate size, an injection amount of the impurity in the channel region, and the like, in terms of the Pch-MOS transistors P1 to P6 and the Nch-MOS transistors N3, N4, are appropriately designed so as to keep the input/output gain of the voltage-voltage signal conversion unit 61a (61b) constant in a frequency band of a signal component contained in the received voltage signals S1 (S4), S2 (S5), as shown in FIG. 16.

As thus described, the voltage-voltage signal conversion unit 61a (61b) converts the voltage signals S1 (S4), S2 (S5) to be inputted, in a state where the input/output gain is constant in a frequency band of a signal component contained in the voltage signals S1 (S4), S2 (S5), into the voltage signals S6a (S8a), S7a (S9a), and then outputs the converted voltage signals S6a (S8a), S7a (S9a).

Accordingly, even in the case of converting a signal into a voltage signal rather than a current signal, a reception signal can be reduced, or magnified to a signal with a large amplitude, and thus can be converted into a signal suitable for signal processing in the equalizer.

Figure 17:
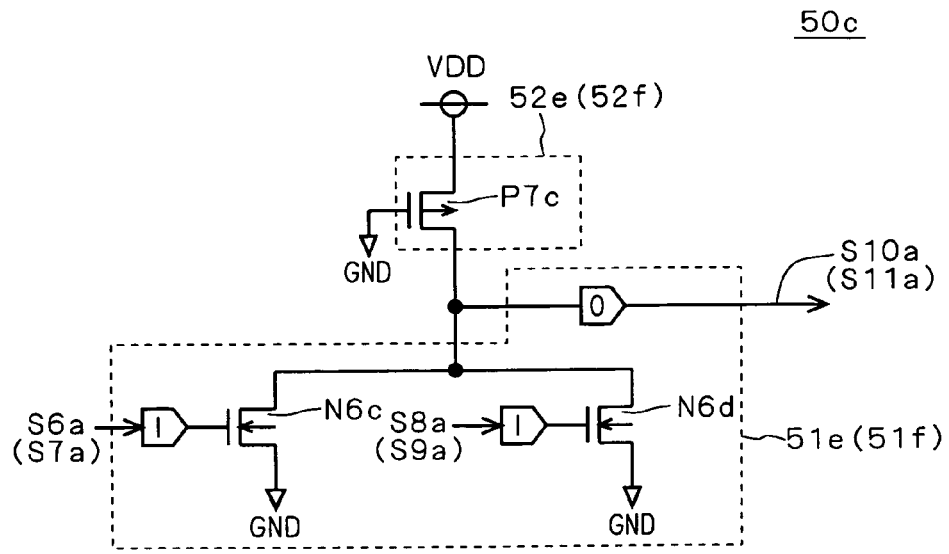
FIG. 17 shows one example of a detailed configuration of an amplifier pre-stage unit.

FIG. 17 is an example showing the detailed configuration of the amplifier pre-stage unit 50. It is to be noted that the amplifier pre-stage unit of FIG. 17 is differentiated by provision of a symbol "50c".

The amplifier pre-stage unit 50c is configured by two groups each including a Pch-MOS transistors P7c and two Nch-MOS transistors N6c, N6d. Among them, two groups of the Pch-MOS transistor P7c configure the resistors 52e, 52f, while two groups each including the Nch-MOS transistors N6c, N6d configure the adders 51e, 51f.

It should be noted that the adder 51e adds the voltage signal S6a to the voltage signal S8a, and reconverts the addition result into the voltage signal S10a, to be outputted. Further, the adder 51f adds the voltage signal S7a to the voltage signal S9a, and reconverts the addition result into the voltage signal S11a, to be outputted.

Further, the resistors 52e, 52f have an equivalent circuit configuration, and the adders 51e, 51f have an equivalent circuit configuration, except for the following differences. The input signals are the voltage signals S6a, S8a and the output signal is the voltage signal S10a in the resistor 52e and the adder 51e, whereas the input signals are the voltage signals S7a, S9a and the output signal is the voltage signal S11a in the resistor 52f and the adder 51f. Therefore, only the circuit configurations of the resistor 52e and the adder 51e are shown in FIG. 17, with each signal in the case of the circuit configuration of the resistor 52f and the adder 51f shown in parenthesis. Also in the following description, each signal in the case of the resistor 52f and the adder 51f is shown in parenthesis, as in FIG. 17.

The voltage signal S6a of the positive logic (voltage signal S7a of the negative logic) is given to a gate of the Nch-MOS transistor N6c. Further, the voltage signal S8a of the negative logic (the voltage signal S9a of the positive logic) is given to a gate of the Nch-MOS transistor N6d. The ground potential GND is supplied to both sources of the Nch-MOS transistors N6c, N6d.

A drain of the Nch-MOS transistor P7c is connected to both drains of the Nch-MOS transistor N6c, N6d. Further, the power supply potential VDD is supplied to a source of the Pch-MOS transistor P7c.

A voltage of a drain of the Pch-MOS transistor P7c is the voltage signal S10a (S11a) as an output signal from the amplifier pre-stage unit 50c to the amplifier 2.

Namely, in the amplifier pre-stage unit 50c of FIG. 17, resistance values of the resistors 52e, 52f are fixed values. Therefore, appropriate designing of the gate size, an injection amount of the impurity in the channel region, and the like in terms of the Pch-MOS transistors P7c enables configuration of a control-free resistor.

It should be noted that the signal S12 shown in FIG. 5 may be given to a gate of the Pch-MOS transistor P7c so as to make the resistors 52e, 52f variable, as in the case of the first embodiment.

Further, this embodiment may be applied to the equalizer according to the second embodiment as well as the equalizer according to the first embodiment.

Fourth Embodiment

A fourth embodiment is also a modification of the equalizer according to the first embodiment, where the voltage signal S12 for determining resistance values of the variable resistors 52a, 52b and the voltage signal S3 for determining a cutoff frequency of the low-pass filter 4a in the first embodiment are automatically generated to be the optimum values.

Figure 18:
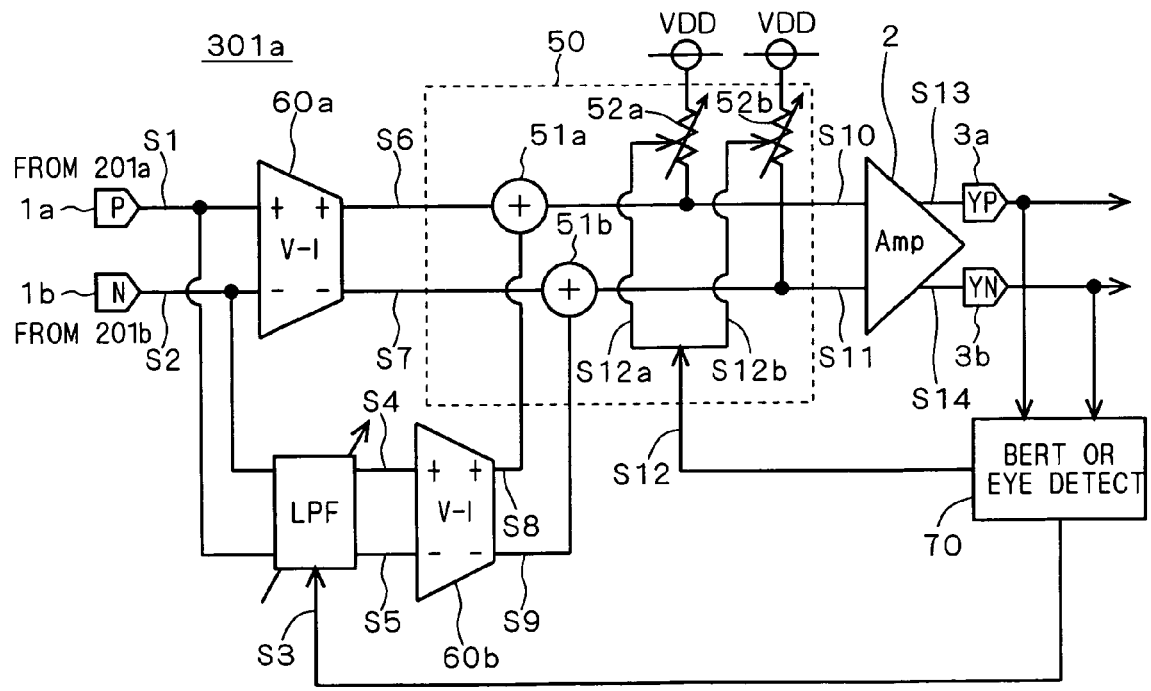
FIG. 18 shows an equalizer according to a fourth embodiment.

FIG. 18 shows an equalizer according to this embodiment. As shown in FIG. 18, the equalizer according to this embodiment further includes a bit error rate tester (BERT) for measuring bit error rates of the reception signals S1, S2 upon receiving the output signals S13, S14 from the amplifier 2, or an eye pattern detector 70 for detecting eye patterns of the reception signals S1, S2 upon receiving the output signals S13, S14 from the amplifier 2.

The bit error rate tester or the eye detector 70 transmits a resistance value adjustment signal as the voltage signal S12 for adjusting resistance values of the variable resistors 52a, 52b, and further transmits a cutoff frequency adjustment signal as the voltage signal S3 for adjusting a cutoff frequency of the low-pass filter 4a.

When the block 70 is the bit error rate tester, the output signals S3 and S12 as the resistance value adjustment signal and the cutoff frequency adjustment signal are generated so as to minimize the bit error rates of the reception signals S1, S2. Further, when the block 70 is the eye pattern detector, the output signals S3 and S12 as the resistance value adjustment signal and the cutoff frequency adjustment signal are generated so as to maximize the areas of the eye patterns of the reception signals S1, S2.

Hence it is possible to optimally set the resistance values of the variable resistors 52a, 52b and the cutoff frequency of the low-pass filter 4a, so as to automatically set the frequency characteristic of the equalizer according to the characteristic of the transmission path for the reception signal.

It is to be noted that, although this embodiment has shown the case where the bit error rate tester or the eye pattern detector 70 outputs both the resistance value adjustment signal and the cutoff frequency adjustment signal, another configuration example may be to output either of the two signals.

Further, this embodiment may be applied to the equalizer according to the second or third embodiment as well as the equalizer according to the first embodiment.

Fifth Embodiment

A fifth embodiment is a semiconductor device on which an equalizer according to any one of the first to fourth embodiments is mounted.

An equalizer including an inductor element is shown in each of FIGS. 3, 9 and 12 of Japanese Patent Application Laid-Open No. 2003-168944. The case of mounting such an equalizer on a semiconductor device is considered.

Figure 19:
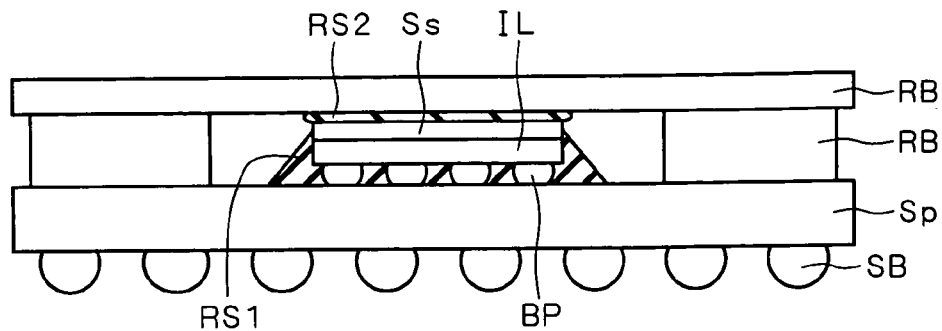
FIG. 19 is a sectional view showing a semiconductor chip including a semiconductor substrate on which an equalizer including an inductor element is formed.

FIG. 19 is a sectional view showing a semiconductor chip as a semiconductor device including a semiconductor substrate on which an equalizer including an inductor element is formed, and a flip chip package containing the semiconductor substrate. This semiconductor chip has a package substrate Sp with a solder ball SB formed on the one-side main face thereof, a package ring PR formed on the periphery of the other-side main surface of the package substrate Sp, and a heat sink RB bonded to the package ring PR. The package substrate Sp, the package ring PR and the heat sink RB configure the flip chip package.

One-side main face of a semiconductor substrate Ss on which the equalizer is formed is bonded to the heat sink RB via a resin RS2. An interlayer insulation film IL is formed on the other-side main face of the semiconductor substrate Ss. A plurality of bumps BP are formed on the surface of the interlayer insulation film IL. The plurality of bumps BP are electrically connected to respective prescribed portions on the package substrate Sp. It is to be noted that a resin RS1 is formed on the peripheries of the plurality of bumps BP and on the surface and in the vicinity of the interlayer insulation film IL, so as to solidify the connection between the plurality of bumps BP and the package substrate Sp.

Figure 20:
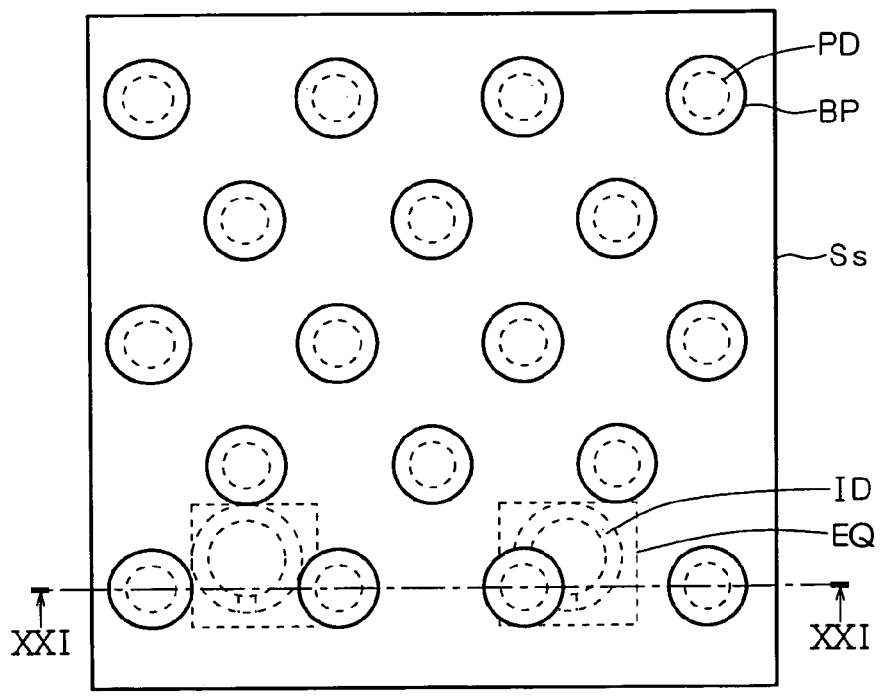
FIG. 20 is a top view showing the semiconductor substrate on which the equalizer is formed.

FIG. 20 is a top view seen from the main face (interlayer insulation film IL forming side) of the semiconductor substrate Ss on which the equalizer is formed. Further, FIG. 21 is a sectional view taken along a cutting line XXI-XXI in FIG. 20.

Figure 21:
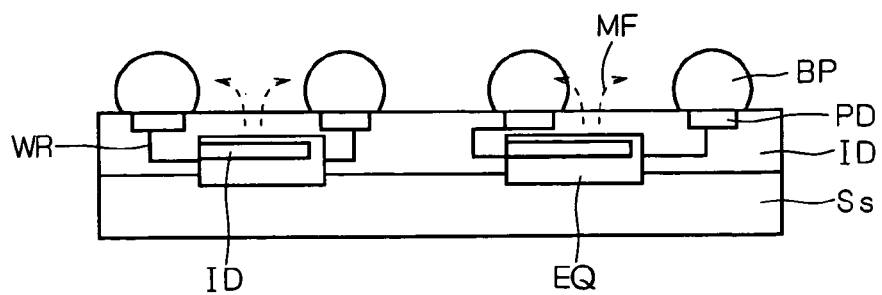
FIG. 21 is a sectional view showing the semiconductor substrate on which the equalizer is formed.

As shown in FIGS. 20, 21, an equalizer EQ is formed on the surface of the semiconductor substrate Ss. The interlayer insulation film IL is formed so as to cover the surface of the semiconductor substrate Ss and the equalizer EQ. Conductive pads PD are formed on the interlayer insulation film IL, and each of the bumps BP is formed on each of the pads PD. It should be noted that the pads PD and the equalizer EQ are electrically connected to each other through wiring WR in the interlayer insulation film IL.

The equalizer EQ includes a ring-like inductor element ID. The inductor element ID generates a magnetic field MF at the time of operation of the circuit. In the case of the equalizer EQ using the inductor element ID, if the flip chip package is adopted, the magnetic field MF generated by inductor element ID is interfered with the bumps BP of the flip chip package, leading to fluctuation in frequency characteristic of the equalizer EQ. Further, in the case of arranging a plurality of equalizers EQ in one package, variations tend to occur in circuit characteristic among the equalizers EQ due to the positional relation between the inductor element ID in each of the equalizers EQ and the bumps BP.

Since an equalizer according to any one of the first to fourth embodiments is mounted on the semiconductor device according to this embodiment, the equalizer includes no inductor element (see configurations of the low-pass filters in FIGS. 6 and 7). Therefore, the above-mentioned problems that may arise in the case of mounting an equalizer including an inductor element on a semiconductor device will not arise in the semiconductor device according to this embodiment.

Figure 22:
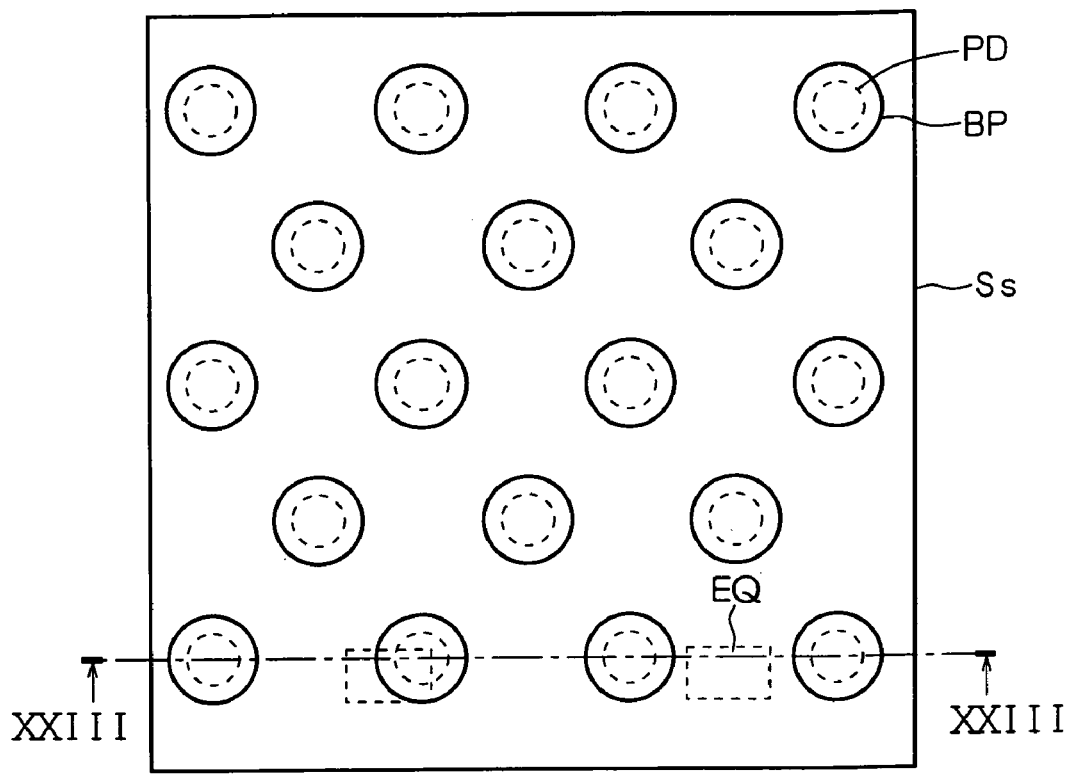
FIG. 22 is a top view of a semiconductor substrate of a semiconductor device according to a fifth embodiment.
Figure 23:
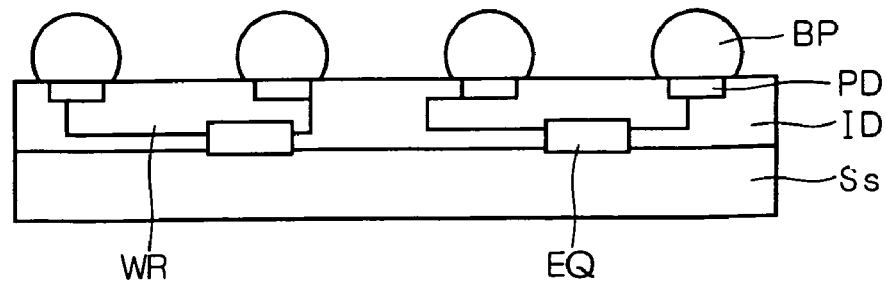
FIG. 23 is a sectional view of the semiconductor substrate of the semiconductor device according to the fifth embodiment.

FIG. 22 is a top view of the semiconductor substrate of the semiconductor device according to this embodiment. FIG. 23 is a sectional view taken along a cutting line XXIII-XXIII in FIG. 22. Symbols used in FIGS. 22 and 23 are respectively the same as those shown in FIGS. 20 and 21, and descriptions of those symbols are thus omitted.

In FIGS. 22 and 23, the inductor element ID is not formed in the equalizer EQ. This equalizer EQ is an equalizer according to any one of the first to fourth embodiments. Namely, the equalizer EQ having no inductor element is formed on the surface of the semiconductor substrate Ss, as in the cases of the low-pass filters 4a and 4b in FIGS. 6 and 7. The flip chip package, configured by the package substrate Sp, the package ring PR and the heat sink RB, contains the semiconductor substrate Ss.

There are problems with the equalizer using the inductor element in that adoption of the flip chip package causes the magnetic field generated by the inductor element to fluctuate the frequency characteristic of the equalizer EQ, and in that variations tend to occur in circuit characteristic among the equalizers due to the positional relation between the inductor element in each of the equalizers and the bumps. However, in the present invention, those problems do not arise since the equalizer EQ includes no inductor element. Further, the problem of increasing a circuit layout area does not arise either, since the equalizer EQ includes no inductor element.

Sixth Embodiment

A sixth embodiment is also a modification of the equalizer according to the first embodiment, where capacitors are provided between the reception end 1a, 1b and the input end of the amplifier 2 in the first embodiment.

FIG. 24 is a circuit diagram showing an equalizer according to this embodiment, which functions as the reception circuit 301c. This equalizer also includes the adders 51a, 51b, the resistors 52a, 52b, the voltage-current signal conversion units 60a, 60b, the low-pass filter 4, and the amplifier 2, which are shown in FIG. 5.

Further, the equalizer of FIG. 24 includes capacitors CPa, CPb respectively on the transmission path for the positive logic signal and the transmission path for the negative logic signal, the respective capacitors having the one electrodes for receiving the reception signals S1, S2, and the other electrodes for receiving the signals S10, S11 to be inputted into the amplifier 2.

With such capacitors CPa, CPb provided, the capacitors CPa, CPb function as bypasses for transmitting a high frequency component of a reception signal to the amplifier 2, thereby allowing improvement in high frequency characteristic of the equalizer.

Further, this embodiment may be applied to the equalizers according to the second to fifth embodiments as well as the equalizer according to the first embodiment.

Modifications

In the first to sixth embodiments, the description has been given based upon the equalizer of FIG. 4. However, it is possible to configure the equalizer of FIG. 2 in the same manner as in the cases of the first to sixth embodiments.

Namely, in the case of applying the first embodiment to the equalizer of FIG. 2, other adders (these adders are not shown, and correspond to the addition unit 6) are provided respectively on the post-stage of the adders 51a, 51b and the pre-stage of the resistors 52a, 52b. Further, the output signals S6 and S7 from the voltage-current signal conversion unit 60a are given to those other adders as well as to the adders 51a, 51b as the subtraction unit 5. Subsequently, in the other adders as the addition unit 6, the output signals from the adders 51a, 51b as the subtraction unit 5 are added to the output signal S6, S7 from the voltage-current signal conversion unit 60a, and the addition results are inputted into the amplifier 2.

Further, in the case of applying the second embodiment to the equalizer of FIG. 2, the low-pass filter 4 may be deleted from the foregoing configuration obtained by applying the first embodiment to the equalizer of FIG. 2. As in the case of the second embodiment, the gate size, an injection amount of the impurity in the channel region, and the like, in terms of the transistors in the voltage-current signal conversion unit 60b, are designed such that the input/output gain of the voltage-current signal conversion unit 60b is constant in a region not higher than a predetermined frequency in a frequency band of a signal component included in the received voltage signals S1 (S4), S2 (S5) and gradually decreases in a region exceeding the predetermined frequency.

Further, in the case of applying the third embodiment to the equalizer of FIG. 2, in the foregoing configuration where the first or second embodiment is applied to the equalizer of FIG. 2, the voltage-current signal conversion units 60a, 60b may be changed to the voltage-voltage signal conversion units 61a, 61b described in the third embodiment.

Further, in the case of applying the fourth embodiment to the equalizer of FIG. 2, the bit error rate tester or the eye pattern detector 70 described in the fourth embodiment may be added to the foregoing configuration where the first or second embodiment is applied to the equalizer of FIG. 2.

Further, in the case of applying the fifth embodiment to the equalizer of FIG. 2, a semiconductor device having the flip chip package described in the fifth embodiment may be adopted in the foregoing configuration where the first or second embodiment is applied to the equalizer of FIG. 2.

Further, in the case of applying the sixth embodiment to the equalizer of FIG. 2, the capacitors CPa, CPb described in the sixth embodiment may be added to the foregoing configuration where the first or second embodiment is applied to the equalizer of FIG. 2.

With the equalizer of FIG. 2 configured in the above-described manners, it is possible to obtain the same effect as the effects of the respective equalizers in the first to sixth embodiments.

While the invention has been shown and described in detail, the foregoing description is in all aspects illustrative and not restrictive. It is therefore understood that numerous modifications and variations can be devised without departing from the scope of the invention.

What is claimed is:

1. An equalizer comprising:
a low-pass filter for receiving a reception signal;
a subtraction unit for subtracting from said reception signal an output signal from said low-pass filter;
an addition unit for adding said reception signal to an output signal from said subtraction unit;
an amplifier for amplifying an output signal from said addition unit;
a bit error rate tester for receiving an output signal from said amplifier to measure a bit error rate of said reception signal, or an eye pattern detector for receiving the output signal from said amplifier to detect an eye pattern of said reception signal, wherein
said bit error rate tester or said eye pattern detector transmits a resistance value adjustment signal for adjusting the resistance value of said resistor,
said bit error rate tester generates said resistance value adjustment signal so as to minimize said bit error rate,
said eye pattern detector generates said resistance value adjustment signal so as to maximize the area of said eye pattern; and
a resistor, wherein
one end of said resistor is connected to an input end of said amplifier,
the other end of said resistor is supplied with a power supply potential, and
a resistance value of said resistor is variable, and
wherein said low-pass filter includes,
a receiving node receiving said reception signal,
an output node outputting said output signal,
a first transistor coupled between said receiving node and said output node, and a second transistor having a gate connected to said output node, a source being supplied a ground potential, and a drain being supplied said ground potential.

2. An equalizer comprising:

a low-pass filter for receiving a reception signal;

a subtraction unit for subtracting from said reception signal an output signal from said low-pass filter;

an addition unit for adding said reception signal to an output signal from said subtraction unit;

an amplifier for amplifying an output signal from said addition unit;

a bit error rate tester for receiving an output signal from said amplifier to measure a bit error rate of said reception signal, or an eye pattern detector for receiving the output signal from said amplifier to detect an eye pattern of said reception signal, wherein said bit error rate tester or said eye pattern detector transmits a cutoff frequency adjustment signal for adjusting the cutoff frequency of said low-pass filter, said bit error rate tester generates said cutoff frequency adjustment signal so as to minimize said bit error rate, and said eye pattern detector generates said cutoff frequency adjustment signal so as to maximize the area of said eye pattern, wherein a cutoff frequency of said low-pass filter is variable, and wherein said low-pass filter includes, a receiving node receiving said reception signal, an output node outputting said output signal, a first transistor coupled between said receiving node and said output node, and a second transistor having a gate connected to said output node, a source being supplied a ground potential, and a drain being supplied said ground potential.

3. An equalizer comprising:

a low-pass filter for receiving a reception signal;

a subtraction unit for subtracting from said reception signal an output signal from said low-pass filter;

an addition unit for adding said reception signal to an output signal from said subtraction unit;

an amplifier for amplifying an output signal from said addition unit;

a bit error rate tester for receiving an output signal from said amplifier to measure a bit error rate of said reception signal, or an eye pattern detector for receiving the output signal from said amplifier to detect an eye pattern of said reception signal, wherein said bit error rate tester or said eye pattern detector transmits a resistance value adjustment signal for adjusting the resistance value of said resistor, said bit error rate tester generates said resistance value adjustment signal so as to minimize said bit error rate, said eye pattern detector generates said resistance value adjustment signal so as to maximize the area of said eye pattern; and a resistor, wherein one end of said resistor is connected to an input end of said amplifier, the other end of said resistor is supplied with a power supply potential, and a resistance value of said resistor is variable.

4. An equalizer comprising:

a low-pass filter for receiving a reception signal;

a subtraction unit for subtracting from said reception signal an output signal from said low-pass filter;

an addition unit for adding said reception signal to an output signal from said subtraction unit;

an amplifier for amplifying an output signal from said addition unit;

a bit error rate tester for receiving an output signal from said amplifier to measure a bit error rate of said reception signal, or an eye pattern detector for receiving the output signal from said amplifier to detect an eye pattern of said reception signal, wherein said bit error rate tester or said eye pattern detector transmits a cutoff frequency adjustment signal for adjusting the cutoff frequency of said low-pass filter, said bit error rate tester generates said cutoff frequency adjustment signal so as to minimize said bit error rate, said eye pattern detector generates said cutoff frequency adjustment signal so as to maximize the area of said eye pattern, and a cutoff frequency of said low-pass filter is variable.

* * * * *